(12) United States Patent
Oka

(10) Patent No.: US 11,571,929 B2
(45) Date of Patent: Feb. 7, 2023

(54) WHEEL HUB

(71) Applicant: Shimano Inc., Osaka (JP)

(72) Inventor: Tomonari Oka, Osaka (JP)

(73) Assignee: Shimano Inc., Osaka (JP)

(*) Notice: Subject to any disclaimer, the term of this patent is extended or adjusted under 35 U.S.C. 154(b) by 324 days.

(21) Appl. No.: 16/903,881

(22) Filed: Jun. 17, 2020

(65) Prior Publication Data
US 2021/0394555 A1 Dec. 23, 2021

(51) Int. Cl.
B60B 27/02 (2006.01)
B60B 1/04 (2006.01)

(52) U.S. Cl.
CPC ............ B60B 27/023 (2013.01); B60B 1/041 (2013.01); B60B 1/042 (2013.01); *B60Y 2200/13* (2013.01)

(58) Field of Classification Search
CPC ....... B60B 1/041; B60B 1/042; B60B 27/023; B60Y 2200/13
See application file for complete search history.

(56) References Cited

U.S. PATENT DOCUMENTS

| | | | |
|---|---|---|---|
| 5,429,421 A * | 7/1995 | Watson | B60B 1/042 301/59 |
| 7,360,847 B2 | 4/2008 | Okajima et al. | |
| 7,631,944 B2 | 12/2009 | Meggiolan | |
| 7,967,392 B2 | 6/2011 | Meggiolan | |
| 9,421,818 B2 | 8/2016 | Koshiyama | |
| 9,815,322 B2 | 11/2017 | Senoo | |
| 2001/0005098 A1* | 6/2001 | Pont | B60B 1/041 301/59 |
| 2008/0211291 A1* | 9/2008 | Meggiolan | B60B 1/041 301/58 |
| 2017/0305189 A1* | 10/2017 | Spahr | B60B 1/041 |
| 2019/0337326 A1 | 11/2019 | Fidelfatti et al. | |
| 2019/0337327 A1* | 11/2019 | Martinello | B60B 1/042 |

FOREIGN PATENT DOCUMENTS

| | | | | |
|---|---|---|---|---|
| DE | 20 2006 002 921 U1 | 6/2006 | | |
| DE | 20 2012 101 196 U1 | 4/2012 | | |
| EP | 3112183 A1 * | 1/2017 | ............ | B60B 1/003 |

* cited by examiner

*Primary Examiner* — Jason R Bellinger
*Assistant Examiner* — Emily G. Castonguay
(74) *Attorney, Agent, or Firm* — Global IP Counselors, LLP

(57) ABSTRACT

A wheel hub has a tubular body having a rotational axis and at least one spoke attachment part protruding radially outward from the tubular body. The spoke attachment part includes a cavity, a first spoke attachment hole, a first spoke head contact surface, a second spoke attachment hole, and a second spoke head contact surface. The cavity includes a spoke insertion opening that opens from the spoke attachment part in an axially outward direction parallel to the rotational axis. The first spoke attachment hole extends from the cavity in a first direction. The first spoke head contact surface is located adjacent the first spoke attachment hole. The second spoke attachment hole extends from the cavity in a second direction. The second spoke head contact surface is located adjacent the second spoke attachment hole.

22 Claims, 14 Drawing Sheets

WHEEL HUB

BACKGROUND

Technical Field

This disclosure generally relates to a wheel hub. More specifically, the present disclosure relates to a wheel hub for a human powered vehicle such as a bicycle.

Background Information

There are many different types of bicycle wheels currently available on the market. Most bicycle wheels have a hub, a plurality of spokes and an annular rim. The hub is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The outer ends of the spokes typically are provided with threads for engaging spoke nipples, which secure the outer ends of the wire spokes to holes in the annular rim. Recently, bicycle wheels have been designed that use straight spokes. Since straight spokes do not have a bent inner end, the hub needs to be designed with special attachment structures for securing the inner end to the hub.

SUMMARY

Generally, the present disclosure is directed to various features of a wheel hub for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that often does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, a recumbent bike, and an electric assist bicycle (E-bike).

In view of the state of the known technology and in accordance with a first aspect of the present disclosure, a wheel hub is provided for a human powered vehicle. Basically, the wheel hub comprises a tubular body having a rotational axis and at least one spoke attachment part protruding radially outward from a first axial end of the tubular body. The at least one spoke attachment part includes a cavity, a first spoke attachment hole, a first spoke head contact surface, a second spoke attachment hole, and a second spoke head contact surface. The cavity includes a spoke insertion opening that opens from the at least one spoke attachment part in an axially outward direction parallel to the rotational axis. The first spoke attachment hole extends from the cavity in a first direction. The first spoke head contact surface is located adjacent the first spoke attachment hole. The second spoke attachment hole extends from the cavity in a second direction. The second spoke head contact surface is located adjacent the second spoke attachment hole. The spoke insertion opening and the first spoke attachment hole are configured relative to each other to receive a first spoke inserted into the cavity through the spoke insertion opening and drawn out of the cavity through the first spoke attachment hole. The spoke insertion opening and the second spoke attachment hole are configured relative to each other to receive a second spoke inserted into the cavity through the spoke insertion opening and drawn out of the cavity through the second spoke attachment hole. The first spoke attachment hole has a first inner end opening with a first center point, and the second spoke attachment hole has a second inner end opening with a second center point. The first center point and the second center point are in axially offset planes, respectively, with respect to the rotational axis of the tubular body, and the first inner end opening and the second inner end opening overlap as viewed in a direction parallel to the axially offset planes. With the wheel hub according to the first aspect, it is possible to improve the rigidity of the wheel structure and lengthen the base of the triangle formed by the tubular body and the spokes.

In accordance with a second aspect of the present disclosure, the wheel hub according to the first aspect is configured so that the first spoke attachment hole has a first outer end opening and the second spoke attachment hole has a second outer end opening, and the first outer end opening and the second outer end opening are located at a same radial distance from the rotational axis of the tubular body. With the wheel hub according to the second aspect, it is possible to improve the reliability and the rigidity of the wheel structure.

In accordance with a third aspect of the present disclosure, the wheel hub according to the first or second aspect is configured so that the first spoke attachment hole has a first outer end opening and the second spoke attachment hole has a second outer end opening, and the first outer end opening and the second outer end opening are substantially aligned in a plane perpendicular to the rotational axis. With the wheel hub according to the third aspect, it is possible to improve the reliability and the rigidity of the wheel structure.

In accordance with a fourth aspect of the present disclosure, the wheel hub according to any of the first to third aspects is configured so that the first spoke attachment hole has a first outer end opening and the second spoke attachment hole has a second outer end opening, the first outer end opening and the second outer end opening each being longer in an axial direction than in a radial direction relative to the rotational axis of the tubular body. With the wheel hub according to the fourth aspect, it is possible to easily attach the first spoke and the second spoke from an axially outward side of the spoke attachment part.

In accordance with a fifth aspect of the present disclosure, the wheel hub according to the fourth aspect is configured so that the first outer end opening has a larger cross-sectional area than the first inner end opening, and the second outer end opening has a larger cross-sectional area than the second inner end opening. With the wheel hub according to the fifth aspect, it is possible to easily attach the first spoke and the second spoke from an axially outward side of the spoke attachment part.

In accordance with a sixth aspect of the present disclosure, the wheel hub according to any of the first to fifth aspects is configured so that the first spoke attachment hole has a first inner side surface that is inclined in an axially inward direction with respect to a plane perpendicular to the rotational axis of the tubular body, and the second spoke attachment hole has a second inner side surface that is inclined in the axially inward direction with respect to the plane perpendicular to the rotational axis of the tubular body. With the wheel hub according to the sixth aspect, it is possible to easily attach the first spoke and the second spoke from an axially outward side of the spoke attachment part.

In accordance with a seventh aspect of the present disclosure, the wheel hub according to the fifth or sixth aspect is configured so that the first outer end opening extends farther in an axially inward direction than the first inner end opening, and the second outer end opening extends farther in the axially inward direction than the second inner end opening. With the wheel hub according to the seventh aspect, it is possible to easily attach the first spoke and the second spoke from an axially outward side of the spoke attachment part.

In accordance with an eighth aspect of the present disclosure, the wheel hub according to any of the first to seventh aspects is configured so that the at least one spoke attachment part is configured to retain a first elongated head of the first spoke within the first spoke attachment hole and a second elongated head of the second spoke within the second spoke attachment hole such that the first elongated head and the second elongated head each has a first radial length and a second radial length relative to a spoke axis, and the first radial length is longer than the second radial length and extends in a radial direction with respect to the rotational axis of the tubular body. With the wheel hub according to the eighth aspect, it is possible to reduce the axial width of the spoke attachment part and reduce the size of the spoke insertion opening.

In accordance with a ninth aspect of the present disclosure, the wheel hub according to the eighth aspect is configured so that the first spoke head contact surface includes a first spoke head receiving recess, the second spoke head contact surface includes a second spoke head receiving recess, and each of the first spoke head receiving recess and the second spoke head receiving recess is longer in the radial direction with respect to the rotational axis of the tubular body than in an axial direction parallel to the rotational axis of the tubular body. With the wheel hub according to the ninth aspect, it is possible to prevent the first spoke and the second spoke from axial and radial shifting with respect to the spoke attachment part.

In accordance with a tenth aspect of the present disclosure, the wheel hub according to any of the first to ninth aspects is configured so that the at least one spoke attachment part includes an outer axially facing surface that includes a first section located on one circumferential side of the spoke insertion opening and a second section located on the other circumferential side of the spoke insertion opening, and the second section is recessed in an axially inward direction parallel to the rotational axis of the tubular body with respect to the first section. With the wheel hub according to the tenth aspect, it is possible to easily attach the first spoke and the second spoke from an axially outward side of the spoke attachment part and reduce the axial width of the spoke attachment part.

In accordance with an eleventh aspect of the present disclosure, the wheel hub according to any of the first to tenth aspects is configured so that the second inner end opening is partly located axially inwardly with respect to the rotational axis of the tubular body than the first inner end opening. With the wheel hub according to the eleventh aspect, it is possible to easily attach the first spoke and the second spoke from an axially outward side of the spoke attachment part and reduce the axial width of the spoke attachment part.

In accordance with a twelfth aspect of the present disclosure, the wheel hub according to the eleventh aspect is configured so that the at least one spoke attachment part includes an outer axially facing surface that includes a first section located on one circumferential side of the spoke insertion opening and a second section located on the other circumferential side of the spoke insertion opening, the second spoke attachment hole is located on a same side of the cavity as the second section, the second section being recessed in an axially inward direction parallel to the rotational axis of the tubular body with respect to the first section. With the wheel hub according to the twelfth aspect, it is possible to easily attach the first spoke and the second spoke from an axially outward side of the spoke attachment part and reduce the axial width of the spoke attachment part.

In accordance with a thirteenth aspect of the present disclosure, the wheel hub according to any of the first to twelfth aspects is configured so that the spoke insertion opening includes a center opening section, a first semi-circular opening section located on one circumferential side of the center opening section, and a second semi-circular opening section located on the other circumferential side of the center opening section. With the wheel hub according to the thirteenth aspect, it is possible to easily attach the first spoke and the second spoke from an axially outward side of the spoke attachment part and reduce the axial width of the spoke attachment part.

In accordance with a fourteenth aspect of the present disclosure, the wheel hub according to any of the first to thirteenth aspects is configured so that the cavity includes an inward axial opening that opens from the at least one spoke attachment part in an axially inward direction parallel to the rotational axis of the tubular body. With the wheel hub according to the fourteenth aspect, it is possible to reduce the weight of the wheel hub.

In accordance with a fifteenth aspect of the present disclosure, the wheel hub according to the fourteenth aspect is configured so that the spoke insertion opening has a larger diameter than the inward axial opening. With the wheel hub according to the fifteenth aspect, it is possible to easily attach the first spoke and the second spoke from an axially outward side of the spoke attachment part.

In accordance with a sixteenth aspect of the present disclosure, the wheel hub according to any of the first to fifteenth aspects is configured so that the at least one spoke attachment part includes a first circumferential side surface and a second circumferential side surface, the first spoke attachment hole has a first outer end opening located at the first circumferential side surface, and the second spoke attachment hole has a second outer end opening located at the second circumferential side surface. With the wheel hub according to the sixteenth aspect, it is possible to reduce vibration by orienting the first spoke and the second spoke to contact adjacent spokes.

In accordance with a seventeenth aspect of the present disclosure, the wheel hub according to any of the first to sixteenth aspects is configured so that the at least one spoke attachment part includes a plurality of the spoke attachment parts protruding radially outward from and circumferentially spaced around the first axial end of the tubular body with respect to each other, and each of the plurality of the spoke attachment parts includes the cavity, the first spoke attachment hole, the first spoke head contact surface, the second spoke attachment hole, and the second spoke head contact surface. With the wheel hub according to the seventeenth aspect, it is possible to orient first spokes in contact with adjacent second spokes to reduce vibration of the first spokes and the second spokes during use of the wheel hub.

In accordance with an eighteenth aspect of the present disclosure, the wheel hub according to the seventeenth aspect is configured so that the first spoke attachment holes and the second spoke attachment holes are configured to cause the first spokes to contact and intersect the second spokes of adjacent ones of the spoke attachment parts. With the wheel hub according to the eighteenth aspect, it is possible to reduce the vibrations of the first spokes and the second spokes during use of the wheel hub.

In accordance with a nineteenth aspect of the present disclosure, the wheel hub according to any of the first to eighteenth aspects is configured so that the first direction is a first tangential direction relative to the tubular body, and the second direction is a second tangential direction relative to the tubular body that is opposite the first tangential direction. With the wheel hub according to the nineteenth aspect, it is possible to orient first spokes in contact with adjacent second spokes to reduce vibration of the first spokes and the second spokes during use of the wheel hub.

In accordance with a twentieth aspect of the present disclosure, the wheel hub according to any of the first to nineteenth aspects is configured so that the second direction is opposite to the first direction with respect to the cavity in a circumferential direction with respect to the rotational axis of the tubular body. With the wheel hub according to the twentieth aspect, it is possible to orient first spokes in contact with adjacent second spokes to reduce vibration of the first spokes and the second spokes during use of the wheel hub.

In accordance with a twenty-first aspect of the present disclosure, a wheel comprises the wheel hub according to any of the first to twentieth aspects and further comprises a rim connected to the wheel hub by a plurality of spokes that include the first spoke and the second spoke. With the wheel hub according to the twenty-first aspect, it is possible to improve rigidity and reduce vibrations of the wheel during use.

Also, other objects, features, aspects and advantages of the disclosed wheel hub will become apparent to those skilled in the art from the following detailed description, which, taken in conjunction with the annexed drawings, discloses preferred embodiments of the wheel hub.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
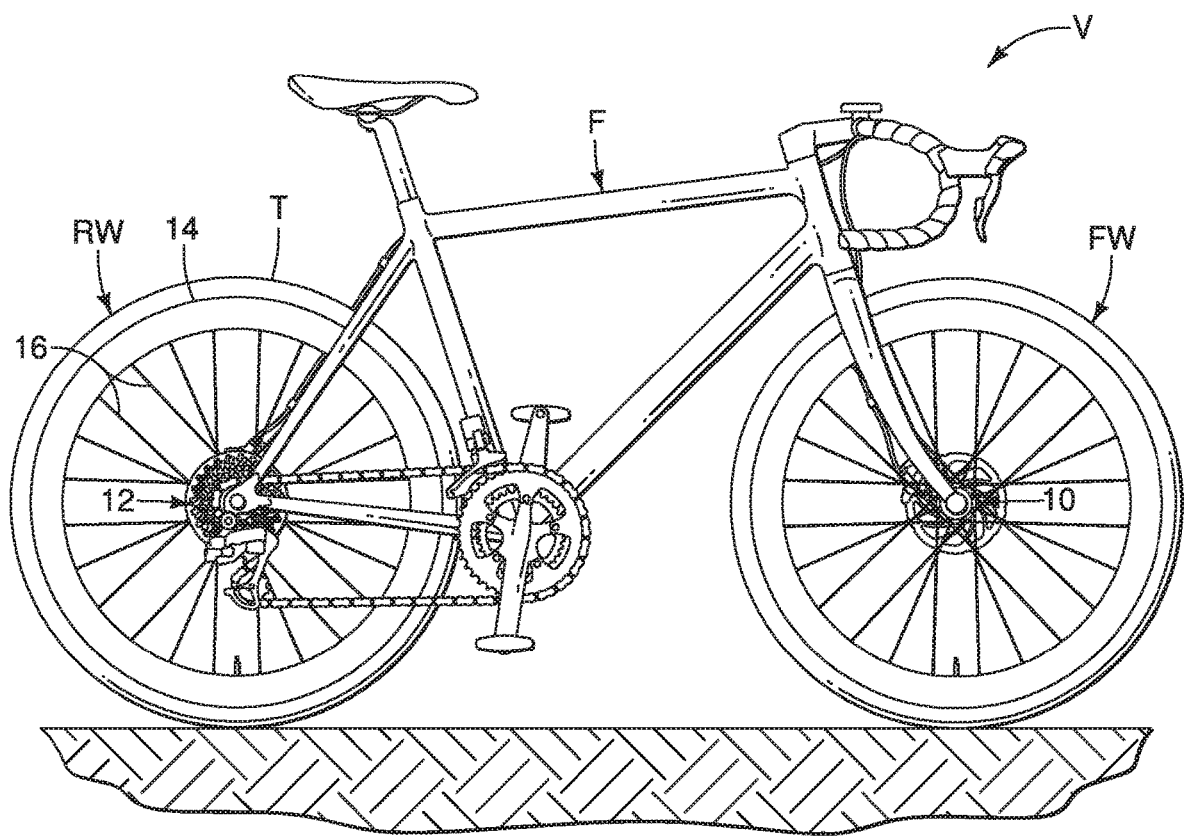
FIG. 1 is a side elevational view of a human-powered vehicle (e.g., a bicycle) equipped with wheels having wheel hubs in accordance with one embodiment.

Referring initially to FIG. 1, a human-powered vehicle V is illustrated that is equipped with a wheel hub 10 in accordance with one embodiment. In particular, the human-powered vehicle V comprises a front wheel FW and a rear wheel RW rotatably attached to a frame F. Here, the wheel hub 10 is a part of the front wheel FW.

Figure 2:
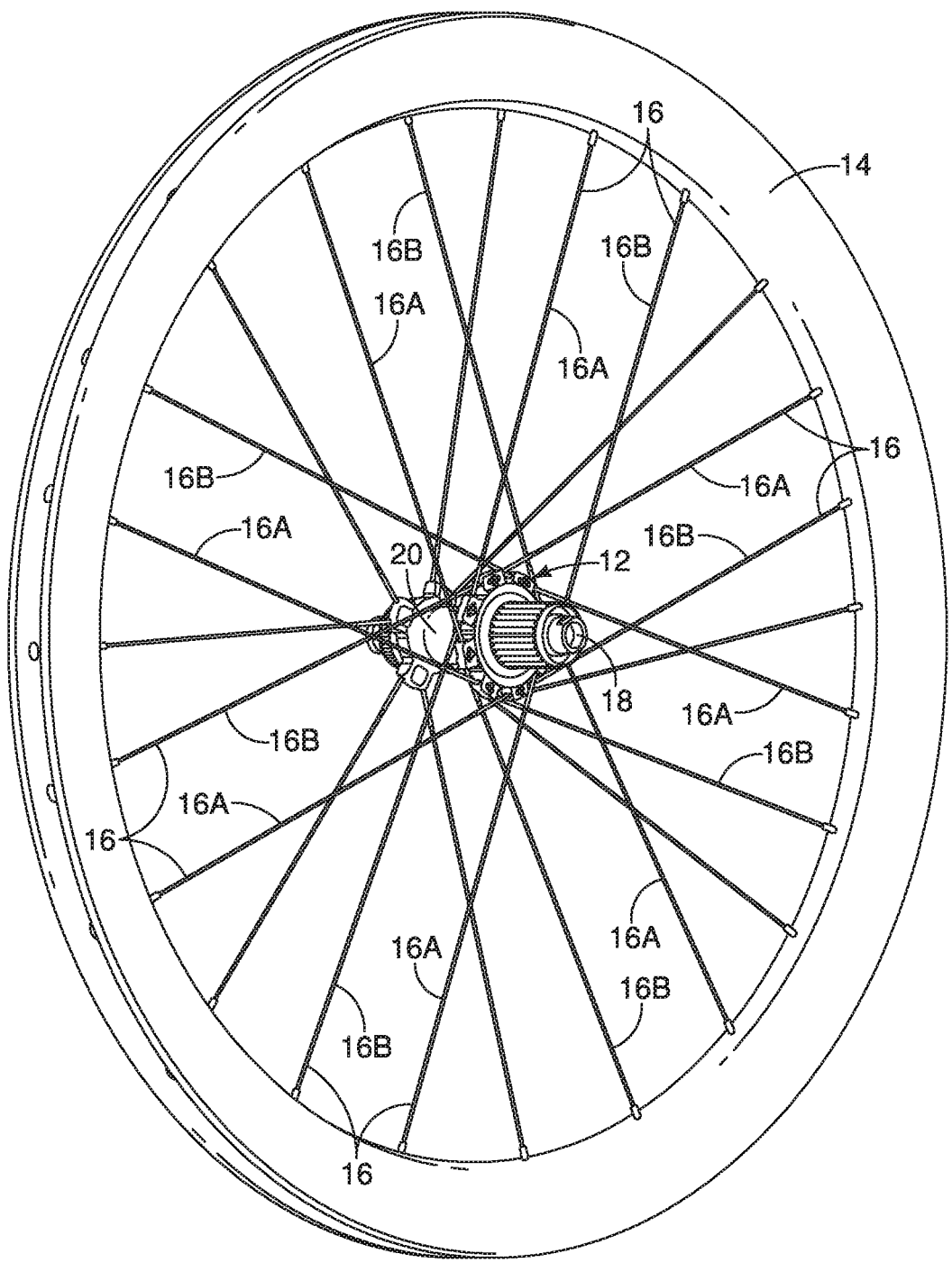
FIG. 2 is a right side perspective view of a rear rim having a plurality of spokes connecting the rear rim to a rear wheel hub in accordance with one embodiment.

As seen in FIG. 2, the rear wheel RW (hereinafter simply referred to as "the wheel RW") is illustrated in which the wheel RW comprises a wheel hub 12. The wheel RW further comprises an annular rim 14 and a plurality of spokes 16, with the rim 14 connected to the wheel hub 12 by the plurality of spokes 16. The plurality of spokes 16 includes a plurality of first spokes 16A and a plurality of second spokes 16B. The wheel RW further includes a tire T that is mounted to the annular rim 14. The wheel hub 12 is substantially identical to the wheel hub 10 except that the wheel hub 12 is configured to include a freewheel for supporting a rear sprocket cassette in a conventional manner. In other words, the wheel hub 10 has the same spoke attachment structure as that of the wheel hub 12 for attaching the spokes 16 thereto. Thus, the wheel hub 10 for the front wheel FW will not be discussed or illustrated in further detail herein.

Each of the plurality of first spokes 16A and the plurality of second spokes 16B is first attached to the wheel hub 12 as described herein, and then attached to the annular rim 14. With the wheel hub 12 described herein, the first spokes 16A are slightly offset from the second spokes 16B in a direction of the rotational axis $A_R$ of the wheel hub 12, with each first spoke 16A crossing and contacting a respective one or more of the second spokes 16B.

Figure 3:
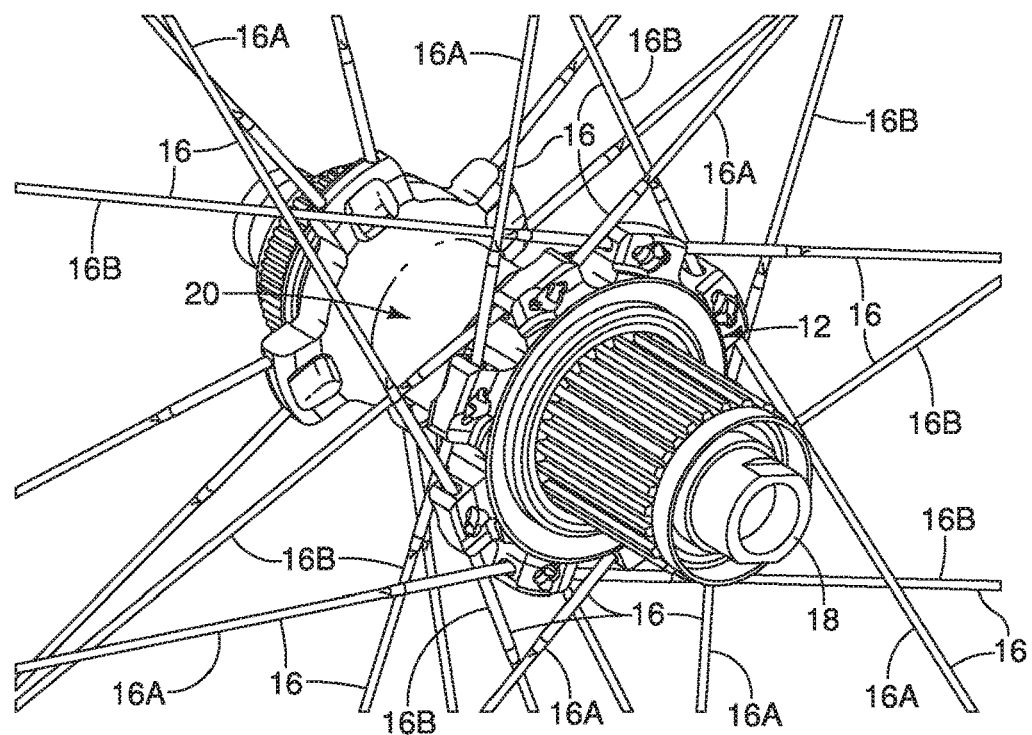
FIG. 3 is an enlarged perspective view of the rear wheel hub and inner portions of the spokes illustrated in FIG. 2.
Figure 4:
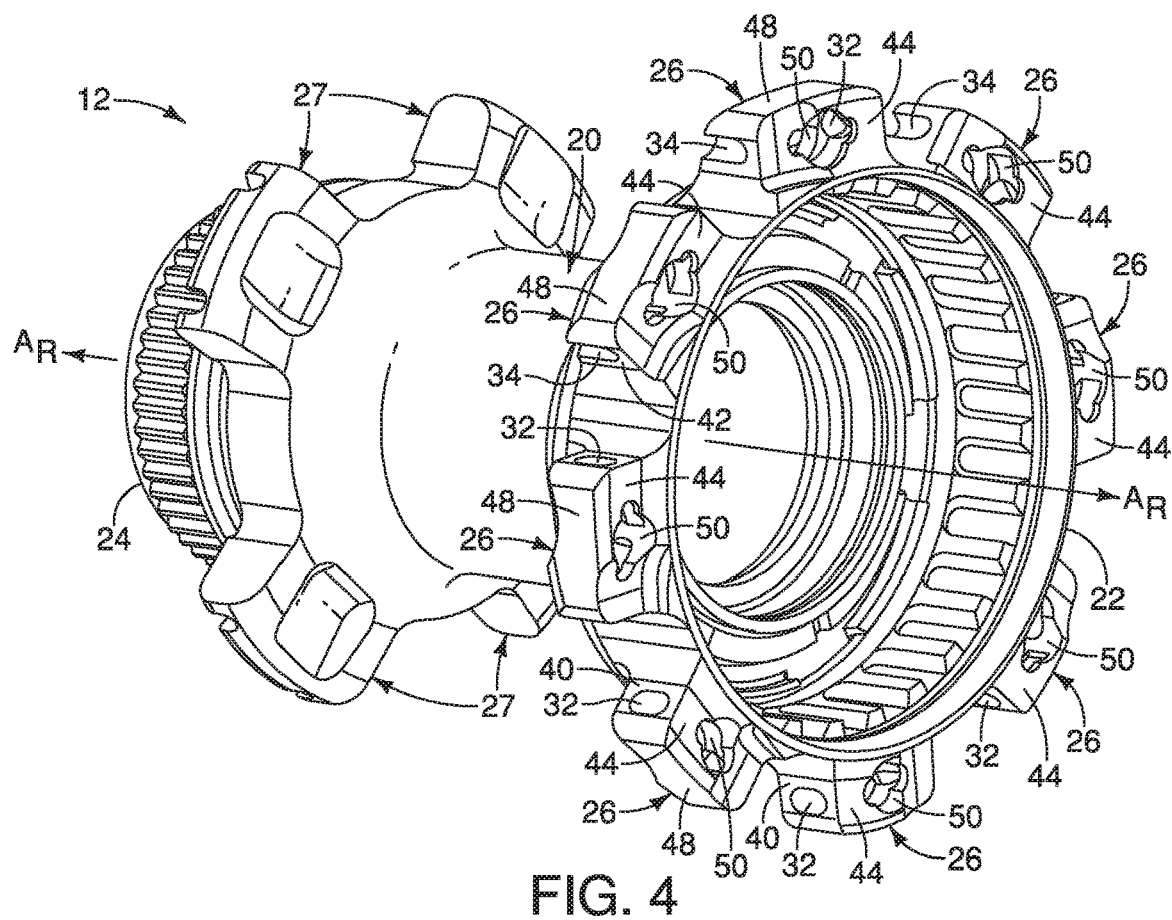
FIG. 4 is an enlarged right side perspective view of a tubular body of the rear wheel hub illustrated in FIG. 3.

Referring to FIGS. 3 and 4, the wheel hub 12 will now be discussed in more detail. As seen in FIG. 3, the wheel hub 12 comprises an axle 18, which directly or indirectly attaches to the wheel hub 12 to the frame F. The wheel hub 12 comprises a tubular body 20 having a rotational axis $A_R$ extending from a first axial end 22 to a second axial end 24. The tubular body 20 is sometimes called a hub shell. The center of the tubular body 20 can form a hollow cylinder around the rotational axis $A_R$, such that the axle 18 can be directly or indirectly attached within the tubular body 20 along the rotational axis $A_R$. Once attached, the tubular body 20 is disposed about the axle 18 such that rotation of the axle 18 around the rotational axis $A_R$ causes rotation of the wheel hub 12, and thus, the wheel RW.

The tubular body 20 of the wheel hub 12 comprises at least one spoke attachment part 26 that protrudes radially outward from the first axial end 22 of the tubular body 20. As seen in FIG. 4, the tubular body 20 of the wheel hub 12 includes eight (8) spoke attachment parts 26 equally spaced at 45 degree increments around the periphery of the first end 22 of the tubular body 20. Here, each of the spoke attachment parts 26 are formed identically. Those of ordinary skill in the art will recognize from this disclosure that more or less than eight (8) spoke attachment parts 26 can be used, and that the degree increments for spacing the spoke attachment parts 26 can be adjusted accordingly.

Figure 7:
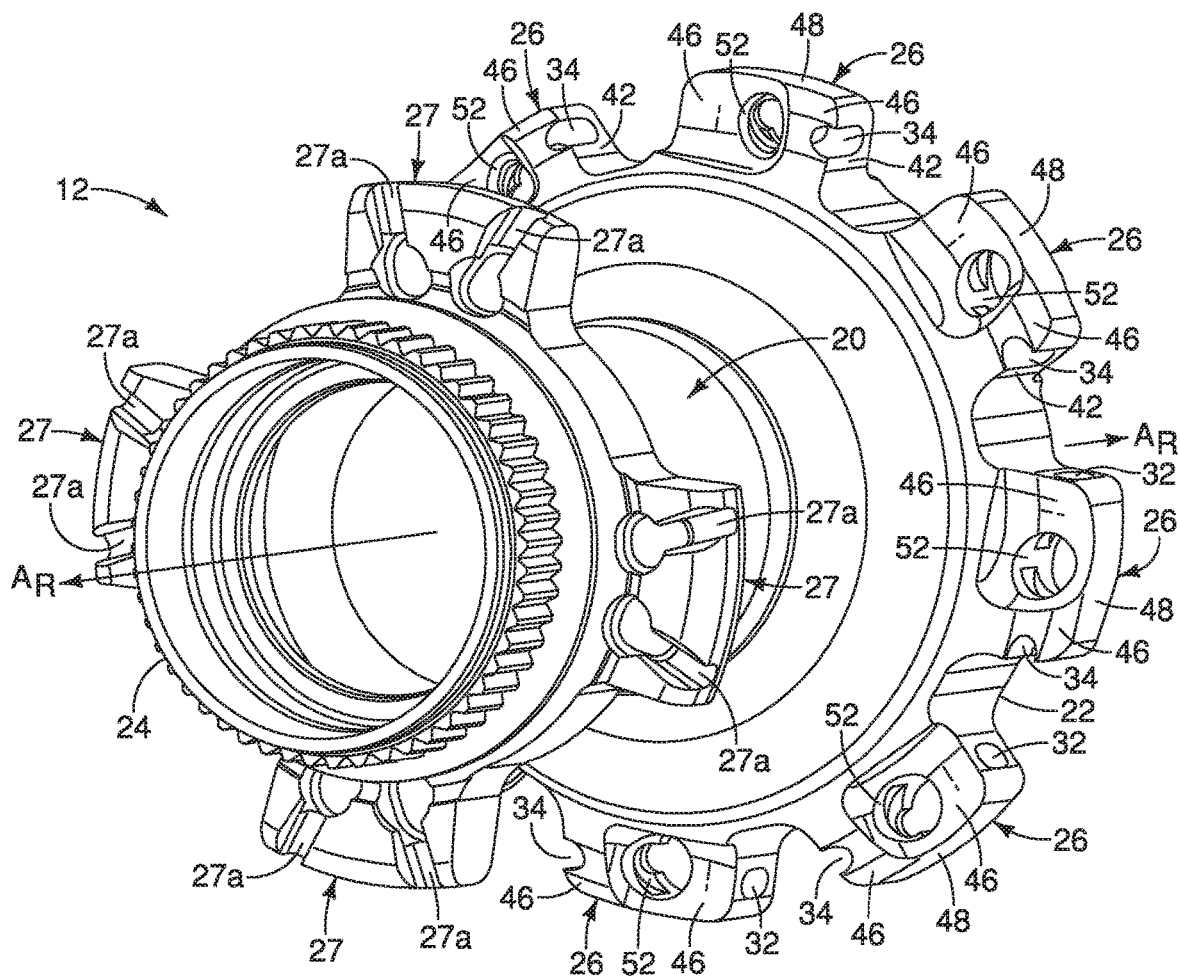
FIG. 7 is an enlarged left side perspective view of the tubular body illustrated in FIG. 4.
Figure 8:
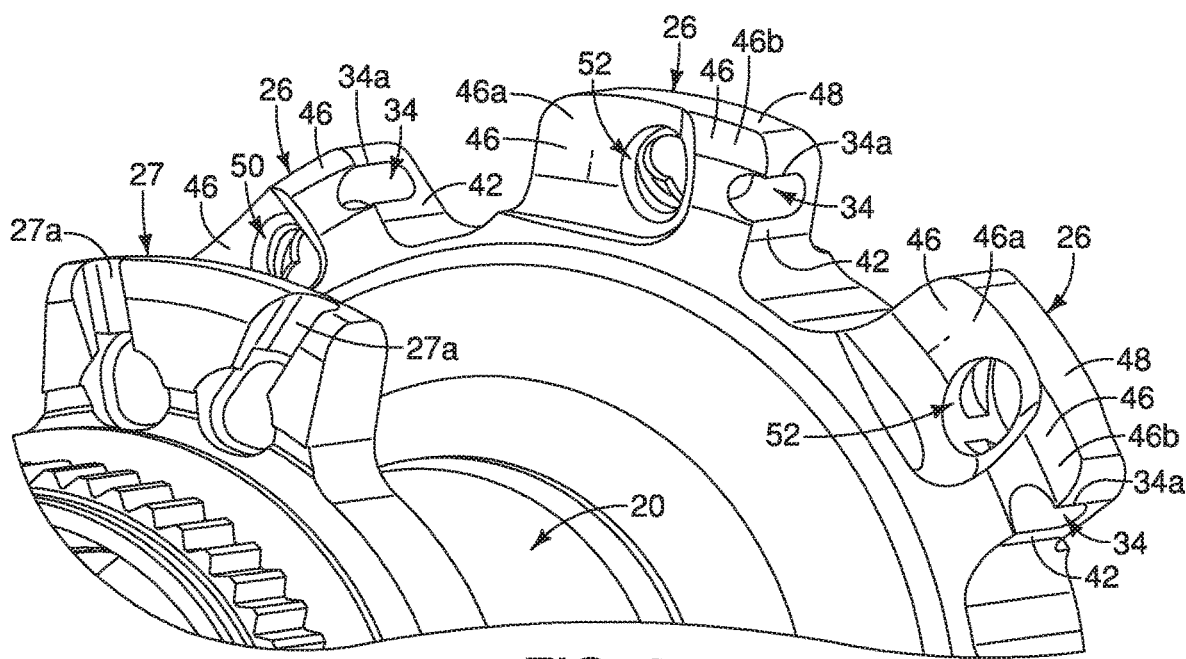
FIG. 8 is an enlarged partial left side perspective view of the tubular body illustrated in FIG. 7.

As seen in FIG. 7, the tubular body 20 of the wheel hub 12 further comprises at least one spoke attachment part 27 protruding radially outwardly from the second axial end 24 of the tubular body 20. When the spoke attachment part 26 and the spoke attachment part 27 are both included as part of the tubular body 20, the spoke attachment part 26 can be considered a first spoke attachment part 26 and the spoke attachment part 27 can be considered a second spoke attachment part 27. The present disclosure focuses on the spoke attachment parts 26 protruding radially outward from the first axial end 22, although those of ordinary skill in the art will understand from this disclosure that many of the features of the spoke attachment parts 26 can also be applied to the spoke attachment parts 27. As described in more detail below, the spoke attachment parts 26 each utilize holes which extend through walls of the spoke attachment parts 26 with surrounding surfaces on all sides of the holes' axes. As seen in FIGS. 7 and 8, the spoke attachment parts 27 instead each include two separate grooves 27a, with each groove 27a slightly tilted with respect to a radially outward direction from the rotational axis $A_R$. The grooves 27a differ from the holes described herein with respect to the spoke attachment parts 26, for example, because each groove 27a is formed as a recess into an outer surface of the spoke attachment part 27, wherein the grooves 27a do not extend through walls of the second spoke attachment parts 27 with surrounding surfaces on all sides of an axis. Additionally, the grooves 27a retain respective spokes in a radially outward direction with respect to the tubular body 20 and rotational axis $A_R$, whereas the holes described herein with respect to the spoke attachment parts 26 instead retain first spokes 16A and second spokes 16B in tangential directions with respect to the tubular body 20 and rotational axis $A_R$, as described in more detail below.

Figure 5:
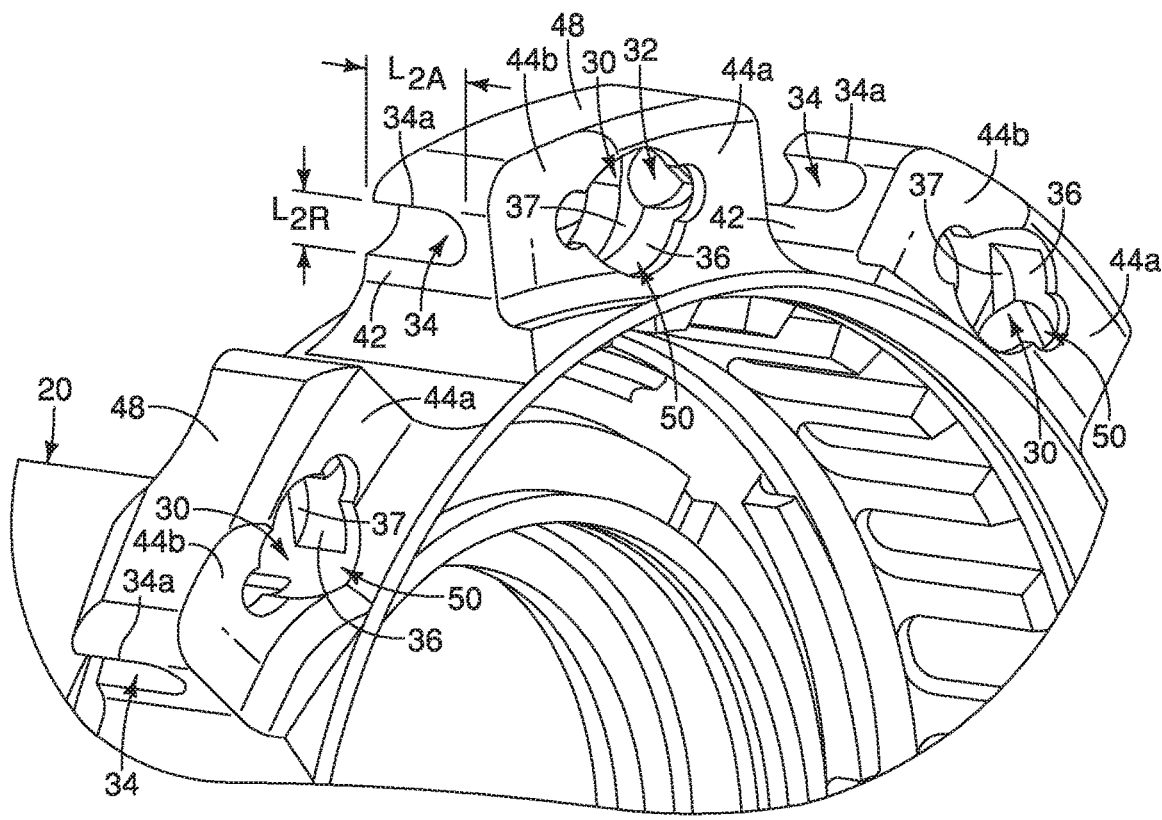
FIG. 5 is a partial perspective view of a portion of the tubular body illustrated in FIG. 4.
Figure 6:
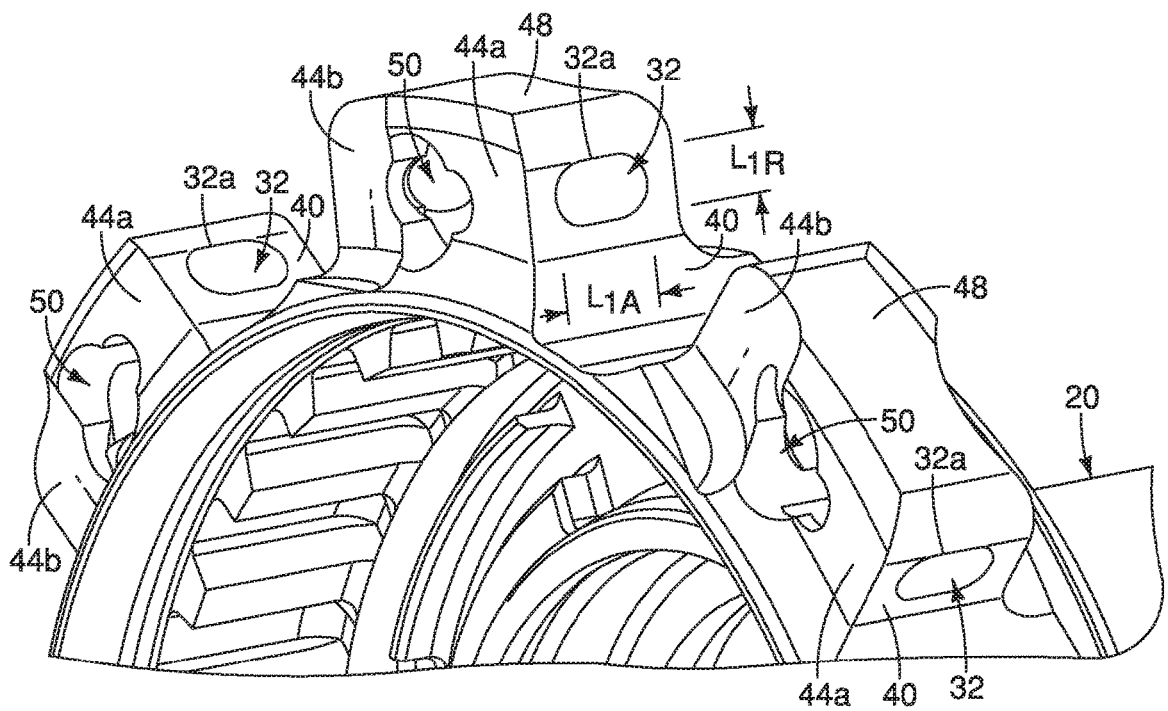
FIG. 6 is another partial right side perspective view of a portion of the tubular body illustrated in FIG. 4.
Figure 11:
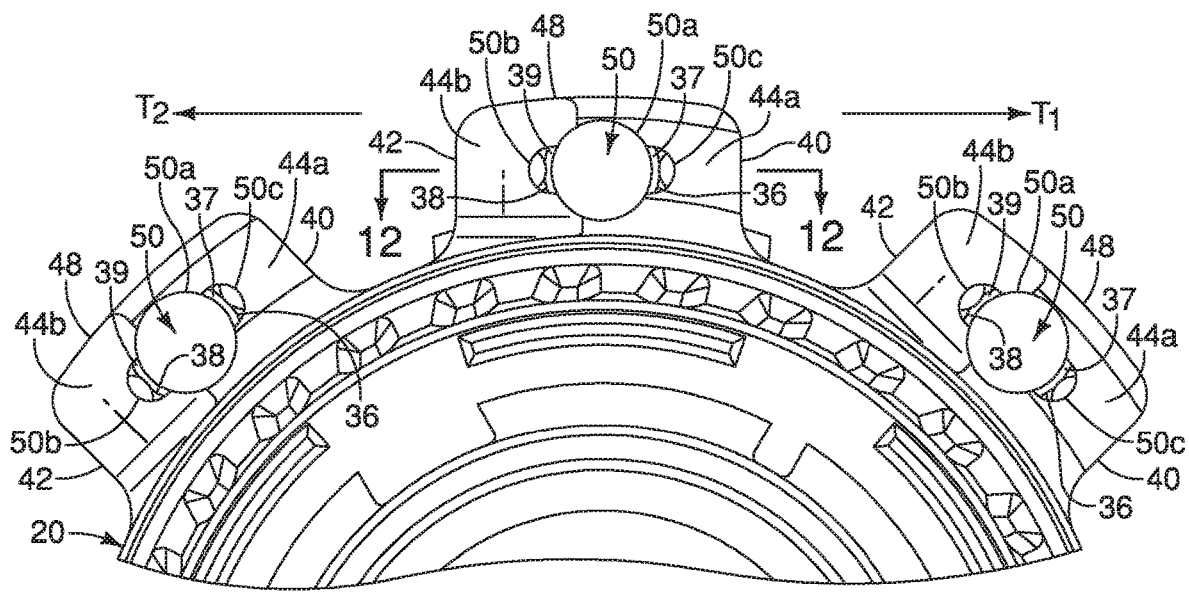
FIG. 11 is an enlarged partial right side elevational view of a portion of the tubular body illustrated in FIG. 10.
Figure 12:
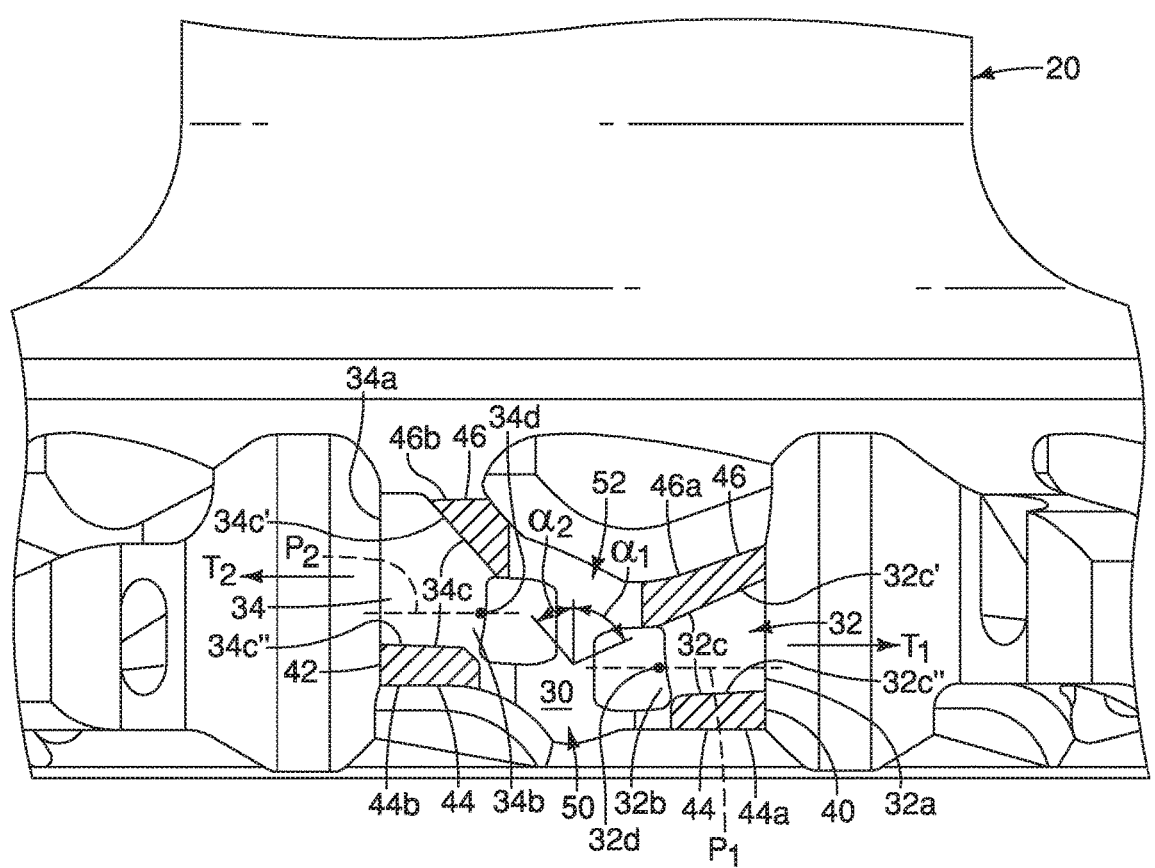
FIG. 12 is a cross-sectional view of a spoke attachment part of the tubular body illustrated in FIG. 11 taken from a section line 12-12 in FIG. 11.
Figure 13:
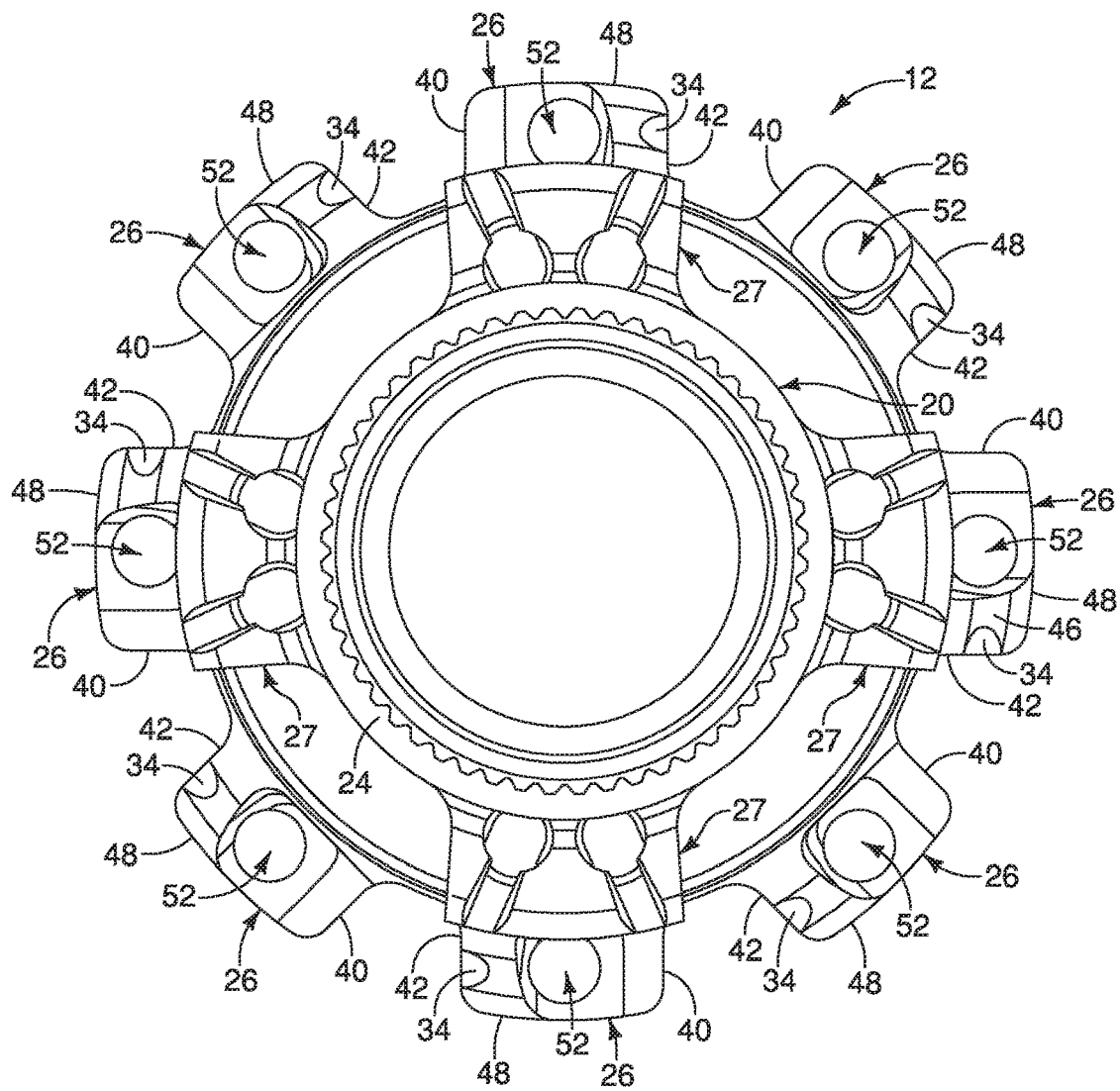
FIG. 13 is a left side elevational view of the tubular body illustrated in FIG. 7.
Figure 16:
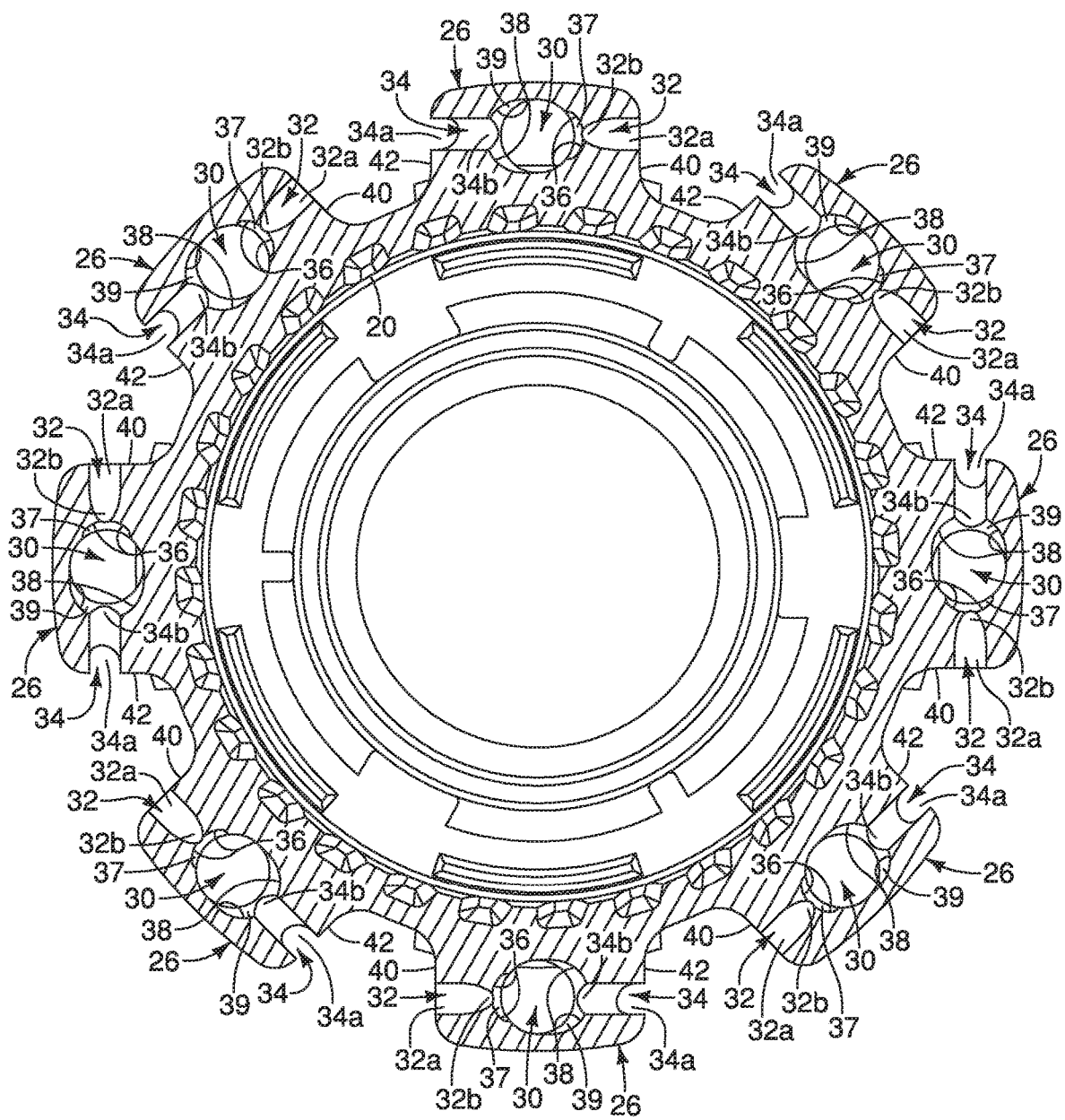
FIG. 16 is a cross-sectional view of the tubular body illustrated in FIG. 15 taken from a section line 16-16 in FIG. 15.

As seen in FIGS. 5, 6 and 11, the spoke attachment part 26 basically includes a cavity 30, a first spoke attachment hole 32, a second spoke attachment hole 34, a first spoke head contact surface 36, and a second spoke head contact surface 38. As seen in FIGS. 12 and 16, the cavity 30 is in communication with each of the first spoke attachment hole 32 and the second spoke attachment hole 34. The first spoke attachment hole 32 extends from the cavity 30 in a first direction. The first spoke attachment hole 32 extends outwardly from the cavity 30 in the first direction. In this embodiment, the first spoke attachment hole 32 extends outwardly from the cavity 30 in a first tangential direction $T_1$ relative to the tubular body 20. The second spoke attachment hole 34 extends from the cavity 30 in a second direction. The second spoke attachment hole 34 extends outwardly from the cavity 30 in the second direction. The second direction is different than the first direction. The second direction is opposite to the first direction with respect to the cavity 30 in the circumferential direction with respect to the rotational axis $A_R$ of the tubular body 20. In this embodiment, the second spoke attachment hole 34 extends outwardly from the cavity 30 in a second tangential direction $T_2$ relative to the tubular body 20. The second tangential direction $T_2$ can be opposite the first tangential direction $T_1$ (e.g., $T_1$ is shown clockwise relative to the tubular body 20 in FIG. 11, while $T_2$ is shown counterclockwise relative to the tubular body 20). Here, the first tangential direction $T_1$ is also approximately parallel to the second tangential direction $T_2$. The first tangential direction $T_1$ is also parallel to the second tangential direction $T_2$. In this way, the first tangential direction $T_1$ and the second tangential direction $T_2$ are not angled in a radial direction with respect to the rotational axis AR of the tubular body 20. In other words, the first tangential direction $T_1$ and the second tangential direction $T_2$ are oriented so as not to cross through the first end 22 of the tubular body if extended forward or backward. Likewise, the first tangential direction $T_1$ and the second tangential direction $T_2$ do not cross a radial surface of the spoke attachment part 26 if extended forward or backward (e.g., do not cross radial surface 48 described below).

The first spoke head contact surface 36 and the second spoke head contact surface 38 are located within the spoke attachment part 26 at an outer boundary of the cavity 30. The first spoke head contact surface 36 is located adjacent the first spoke attachment hole 32 and is configured to contact an elongated head 16e of a first spoke 16A upon insertion of the first spoke 16A into the first spoke attachment hole 32. Likewise, the second spoke head contact surface 38 is located adjacent the second spoke attachment hole 34, and is configured to contact an elongated head 16e of a second spoke 16B upon insertion of the second spoke 16B into the second spoke attachment hole 34. In this way, the first spoke head contact surface 36 and the second spoke head contact surface 38 help retain the first spoke 16A and the second spoke 16B, respectively, within the spoke attachment part 26. Additionally, as explained in more detail below, the first spoke head contact surface 36 includes a first spoke head receiving recess 37 dimensioned to accept the elongated head 16e of the first spoke 16A and thereafter prevent the first spoke 16A from rotating about its spoke axis $A_S$. Likewise, the second spoke head contact surface 38 includes a second spoke head receiving recess 39 dimensioned to accept the elongated head 16e of the second spoke 16B and thereafter prevent the second spoke 16B from rotating about its spoke axis $A_S$.

Those of ordinary skill in the art will recognize from this disclosure that the precise number of surfaces of a spoke attachment part 26 can vary. Here, each spoke attachment part 26 basically includes a first circumferential side surface 40, a second circumferential side surface 42, an outer axially facing surface 44, an inner axially facing surface 46, and a radial surface 48. The first circumferential side surface 40 and the second circumferential side surface 42 are located on opposite sides of the cavity 30 in a direction parallel to the first tangential direction $T_1$ or the second tangential direction $T_2$ and form opposite outer surfaces of the spoke attachment part 26. Similarly, the outer axially facing surface 44 and the inner axially facing surface 46 are located on opposite sides of the cavity 30 in a direction parallel to the rotational axis $A_R$ of the tubular body 20 and form opposite outer surfaces of the spoke attachment part 26. The first spoke attachment hole 32 extends between the first spoke head contact surface 36 and the first circumferential side surface 40, and the second spoke attachment hole 34 extends between the second spoke head contact surface 38 and the second circumferential side surface 42. As seen in FIG. 8, a portion of the second spoke attachment hole 34 can also be located on the inner axially facing surface 46. Here, each of the second circumferential side surface 42 and the inner axially facing surface 46 includes an outer portion of the second spoke attachment hole 34.

The cavity 30 enables insertion of a first spoke 16A into the first spoke attachment hole 32 and of the second spoke 16B into the second spoke insertion hole 34. The cavity 30 includes a spoke insertion opening 50 that opens from the spoke attachment part 26 through the outer axially facing surface 44 in an axially outward direction parallel to the rotational axis $A_R$. By locating the spoke insertion opening 50 in this manner, a first spoke 16A can be inserted into the spoke insertion opening 50 and drawn out of the cavity 30 through the first spoke attachment hole 32, and a second spoke 16B can be inserted into the spoke insertion opening 50 and drawn out of the cavity 30 through the second spoke attachment hole 34. In this way, the spoke insertion opening 50 and the first spoke attachment hole 32 are configured relative to each other to receive a first spoke 16A inserted into the cavity 30 through the spoke insertion opening 50 and drawn out of the cavity 30 through the first spoke attachment hole 32. Likewise, the spoke insertion opening 50 and the second spoke attachment hole 34 are configured relative to each other to receive a second spoke 16B inserted into the cavity 30 through the spoke insertion opening 50 and drawn out of the cavity 30 through the second spoke attachment hole 34. The insertion of the first spoke 16A and the second spoke 16B is discussed in more detail below with reference to FIGS. 19 to 24.

The spoke insertion opening 50 can be dimensioned to allow for angled insertion of the first spoke 16A and the second spoke 16B with respect to the rotational axis $A_R$ of the tubular body 20. As best seen in FIG. 11, the spoke insertion opening 50 can include multiple sections. Specifically, the spoke insertion opening 50 includes a center opening section 50a, a first semi-circular opening section 50b located on one circumferential side of the center opening section 50a, and a second semi-circular opening section 50c located on the other circumferential side of the center opening section 50a. The first semi-circular opening section 50b accepts the first spoke 16A when the first spoke 16A is inserted into the first spoke attachment hole 32 at an angle. Likewise, the second semi-circular opening section 50c accepts the second spoke 16B when the second spoke 16B is inserted into the second spoke attachment hole 34 at an angle. The radius and cross-sectional area of the first semi-circular opening section 50b are each smaller than that of the center spoke insertion opening 50a, and the radius and cross-sectional area of the second semi-circular opening section 50c are each smaller than that of the center spoke insertion opening 50a. Here, the diameter of the first semi-circular opening section 50b and the second semi-circular opening section 50c can be larger than the second radial length $L_2$ of an elongated head 16e as discussed below.

Those of ordinary skill in the art will recognize from this disclosure that other shapes besides semi-circles can also be used.

As seen in FIG. 12, the first spoke attachment hole 32 and the second spoke attachment hole 34 are dimensioned to enable the first spoke 16A and the second spoke 16B, respectively, to be drawn through the spoke attachment opening 50 at an angle and eventually retained by the spoke attachment part 26 in opposite tangential directions ($T_1$ and $T_2$). More specifically, the first spoke attachment hole 32 is dimensioned to initially accept the first spoke 16A at an angle $\alpha_1$ via the spoke insertion opening 50, and then retain the first spoke 16A in the first tangential direction $T_1$ relative to the tubular body 20. Likewise, the second spoke attachment hole 34 is dimensioned to initially accept the second spoke 16B at an angle $\alpha_2$ via the spoke insertion opening 50, and then retain the second spoke 16B in the second tangential direction $T_2$ relative to the tubular body 20. In FIG. 12, the angle $\alpha_1$ and the angle $\alpha_2$ are taken with respect to a line parallel to the rotational axis $A_R$ of the tubular body.

As seen in FIG. 12, the first spoke attachment hole 32 extends from the cavity 30 in the first tangential direction $T_1$ relative to the tubular body 20. The first spoke attachment hole 32 has a first outer end opening 32a, a first inner end opening 32b, and a first inner surface 32c. The first outer end opening 32a is located at the first circumferential side surface 40. The first inner end opening 32b has a first center point 32d and is located at the first spoke head contact surface 36 (not seen in FIG. 12). The first center point 32d is located at the center of the first inner end opening 32b. The center of the first inner end opening 32b may include a geometric center of the first inner end opening 32b. In FIG. 12, the first center point 32d lies in a first plane $P_1$. The first plane $P_1$ is perpendicular to the rotational axis $A_R$ of the tubular body 20. The first plane $P_1$ includes the first center point 32d. The first inner side surface 32c includes an axially inward surface 32c' and an axially outward surface 32c" when viewed from the perspective of FIG. 12. The axially inward surface 32c' of the first inner side surface 32c is inclined in an axially inward direction with respect to a plane perpendicular to the rotational axis $A_R$ of the tubular body 20, such that the first outer end opening 32a has a larger cross-sectional area than the first inner end opening 32b. The first outer end opening 32a also extends farther in an axially inward direction than the first inner end opening 32b, such that the first spoke 16A can be inserted into the first spoke attachment hole 32 at an angle $\alpha_1$ along the axially inward surface 32c', and then shifted axially outward along the first outer end opening 32a to become substantially parallel with the axially outward surface 32c". The axially outward surface 32c" can be approximately parallel to a plane perpendicular to the rotational axis of the tubular body 20. The axially outward surface 32c" can be parallel to a plane perpendicular to the rotational axis of the tubular body 20.

As seen in FIG. 12, the second spoke attachment hole 34 extends from the cavity 30 in a second tangential direction $T_2$ relative to the tubular body 20. The second tangential direction $T_2$ can be opposite the first tangential direction $T_1$ (e.g., $T_1$ is shown clockwise relative to the tubular body 20 in FIG. 11, while $T_2$ is shown counterclockwise relative to the tubular body 20). The second spoke attachment hole 34 has a second outer end opening 34a, a second inner end opening 34b, and a second inner surface 34c. The second outer end opening 34a is located at the second circumferential side surface 42. The second inner end opening 34b has a second center point 34d and is located at the second spoke head contact surface 38 (not seen in FIG. 12). The second center point 34d is located at the center of the second inner end opening 34b. The center of the second inner end opening 34b may include a geometric center of the second inner end opening 34b. As seen in FIG. 12, the second center point 34d lies in a second plane $P_2$. The second plane $P_2$ is perpendicular to the rotational axis $A_R$ of the tubular body 20. The second plane $P_2$ includes the second center point 34d. The second inner side surface 34c includes an axially inward surface 34c' and an axially outward surface 34c" when viewed from the perspective of FIG. 12. The axially inward surface 34c' of the second inner side surface 34c is inclined in the axially inward direction with respect to a plane perpendicular to the rotational axis $A_R$ of the tubular body 20, such that the second outer end opening 34a has a larger cross-sectional area than the second inner end opening 34b. The second outer end opening 34a also extends farther in the axially inward direction than the second inner end opening 34b, such that the second spoke 16B can be inserted into the second spoke attachment hole 34 at an angle $\alpha_2$ along the axially inward surface 34c', and then shifted axially outward along the second outer end opening 34a to become substantially parallel with the axially outward surface 34c". The axially outward surface 34c" can be approximately parallel to a plane perpendicular to the rotational axis of the tubular body 20. The axially outward surface 34c" can be parallel to a plane perpendicular to the rotational axis of the tubular body 20.

The first spoke attachment hole 32 and the second spoke attachment hole 34 are further arranged with respect to each other so that the first spoke 16A and the second spoke 16B are slightly offset in relation to each other. Moreover, the first spoke 16A is slightly offset in relation to the second spoke 16B from an adjacent one of the spoke attachment parts 26, and the second spoke 16B is offset in relation to the first spoke 16A from an adjacent one of the spoke attachment parts 26 (see FIG. 2). The second inner end opening 34b is partly located axially inwardly with respect to the rotational axis $A_R$ of the tubular body 20 than the first inner end opening 32a, with the axially outward surface 34c" of the second spoke attachment hole 34 slightly offset from the axially outward surface 32c" of the first spoke attachment hole 32 in the direction of the rotational axis $A_R$. Thus, as seen in FIG. 12, the first center point 32d and the second center point 34d are in axially offset planes $P_1$ and $P_2$, respectively, with respect to the rotational axis $A_R$ of the tubular body 20. Additionally, the first inner end opening 32b and the second inner end opening 34b overlap as viewed in a direction parallel to the axially offset planes $P_1$ and $P_2$.

By arranging the first spoke attachment hole 32 and the second spoke attachment hole 34 in this manner, the first spokes 16A and the second spokes 16B are slightly offset and contacting when attached to cross each other as shown in FIGS. 2 and 3.

The first outer end opening 32a and the second outer end opening 34a are also located at approximately the same radial distance from the rotational axis $A_R$ of the tubular body 20. In this embodiment, the first outer end opening 32a and the second outer end opening 34a are also located at the same radial distance from the rotational axis $A_R$ of the tubular body 20. Likewise, the first outer end opening 32a and the second outer end opening 34a are substantially aligned in a plane perpendicular to the rotational axis $A_R$. The first outer end opening 32a and the second outer end opening 34a are aligned in a plane perpendicular to the rotational axis $A_R$. For example, the cross-sectional area of the first outer end opening 32a and the cross-sectional area of the second outer end opening 34a are cut by a plane perpendicular to the rotational axis $A_R$. In this way, the first spokes 16A and the second spokes 16B can be used interchangeably because any spoke 16 will extend to the annular rim 14 as desired whether drawn through either of the first spoke attachment hole 32 or the second spoke attachment hole 34.

The first outer end opening 32a and the second outer end opening 34a are each longer in an axial direction than in a radial direction relative to the rotational axis $A_R$ of the tubular body 20. As seen in FIG. 6, the first outer end opening 32a has a longer length $L_{1A}$ in the axial direction than a length $L_{1R}$ in a radial direction relative to the rotational axis $A_R$ of the tubular body 20. As seen in FIG. 5, the second outer end opening 34a has a longer length $L_{2A}$ in the axial direction than a length $L_{2R}$ in a radial direction relative to the rotational axis $A_R$ of the tubular body 20. In this way, the first spoke 16A protrudes through the axially inward side of the first outer end opening 32a at the axially inward surface 32c' when first inserted into the first spoke attachment hole 32. Then, as the first spoke 16A is drawn through the first spoke attachment hole 32, the first spoke 16A slides axially outward to the axially outward side of the first outer end opening 32a at the axially outward surface 32c" Likewise, the second spoke 16B protrudes through the axially inward side of the second outer end opening 34a at the axially inward surface 34c' when first inserted into the second spoke attachment hole 34. Then, as the second spoke 16B is drawn through the second spoke attachment hole 34, the second spoke 16B slides axially outward to the axially outward side of the second outer end opening 34a at the axially outward surface 34c".

Figure 19:
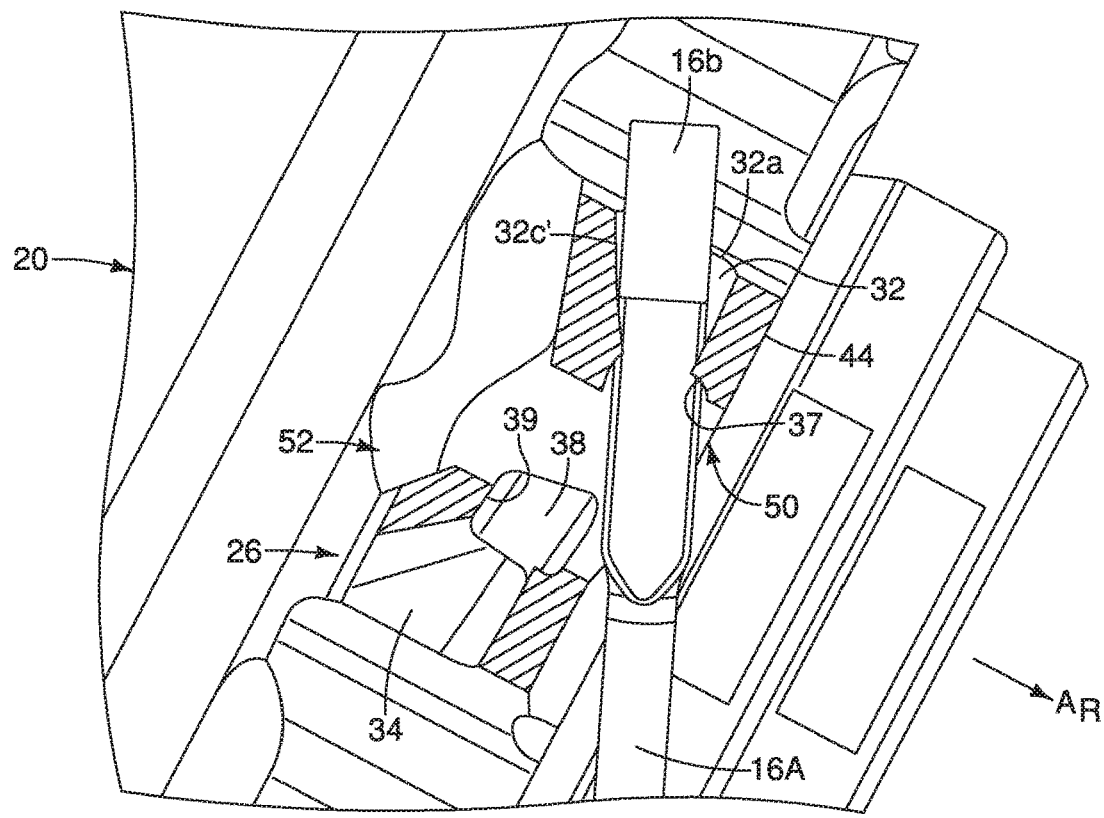
FIGS. 19 to 24 illustrate the attachment of a pair of the spokes shown in FIGS. 17 and 18 to the wheel hub shown in FIGS. 4 to 16.
Figure 20:
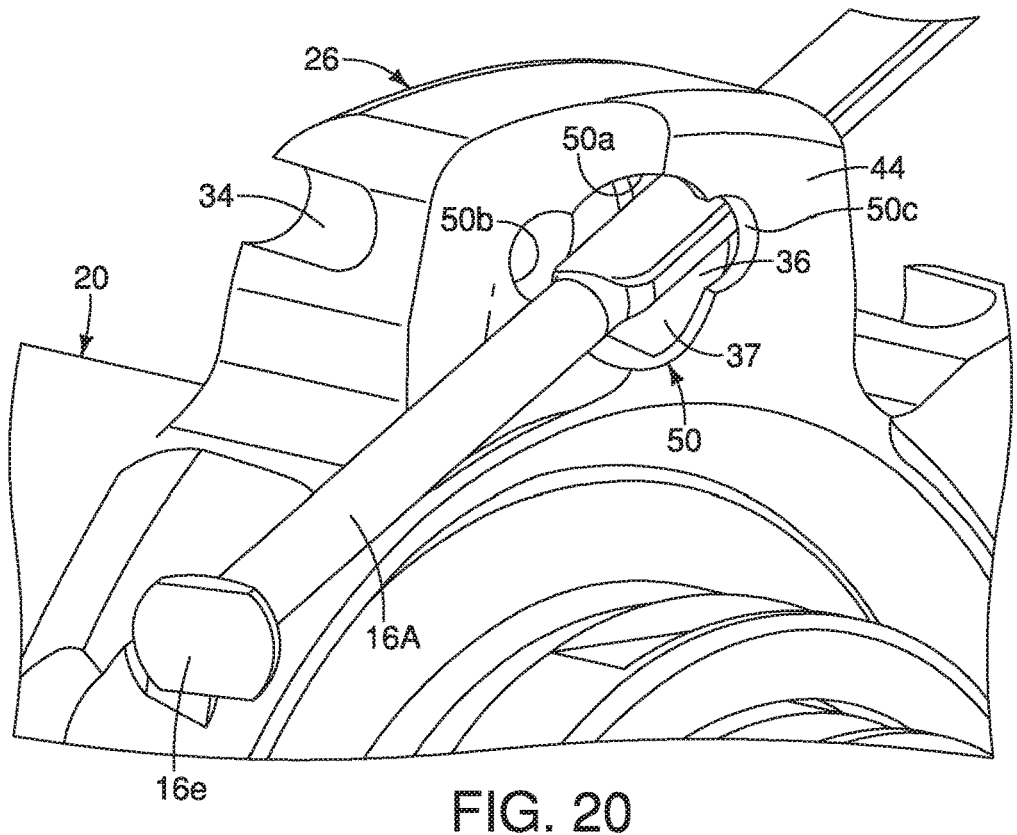
Figure 21:
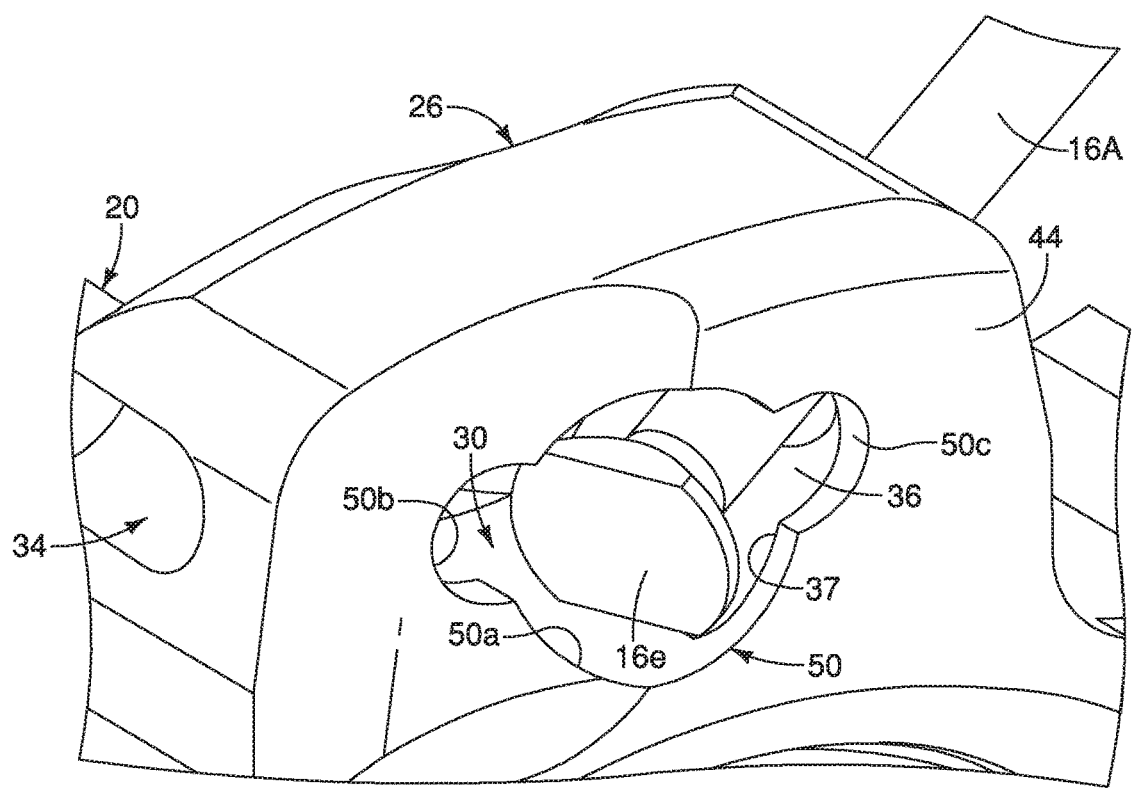

The outer axially facing surface 44 of the spoke attachment part 26 is further configured with a recess to enable insertion of the first spoke 16A into the first spoke insertion hole 34 at an angle $\alpha_1$ relative to the rotational axis $A_R$ of the tubular body 20. As seen in FIGS. 5 and 12, the outer axially facing surface 44 includes a first section 44a located on one circumferential side of the spoke insertion opening 50 and a second section 44b located on the other circumferential side of the spoke insertion opening 50. The second section 44b is recessed in an axially inward direction parallel to the rotational axis $A_R$ of the tubular body 20 with respect to the first section 44a, with the second spoke attachment hole 34 located on the side of the cavity 30 with the second section 44b. In this way, it is easier to angle the first spoke 16A for insertion through the first spoke attachment hole 32, as seen in FIGS. 19 to 21, since the first inner end opening 32b is located slightly axially outward in comparison to the second inner end opening 34b.

The inner axially facing surface 46 can also be configured with a recess to decrease the material needed for a spoke attachment part 26 and thus the weight of the tubular body 20. As seen in FIG. 12, the inner axially facing surface 46 includes a first section 46a located on the side of cavity 30 with the first spoke attachment hole 32, and includes a second section 46b located on the side of cavity 30 with the second spoke attachment hole 34. The first section 46a is recessed in an axially outward direction parallel to the rotational axis $A_R$ of the tubular body 20 with respect to the second section 46b. Here, the second spoke attachment hole 34 partially extends into the second section 46b (e.g., also shown in FIG. 8).

Figure 9:
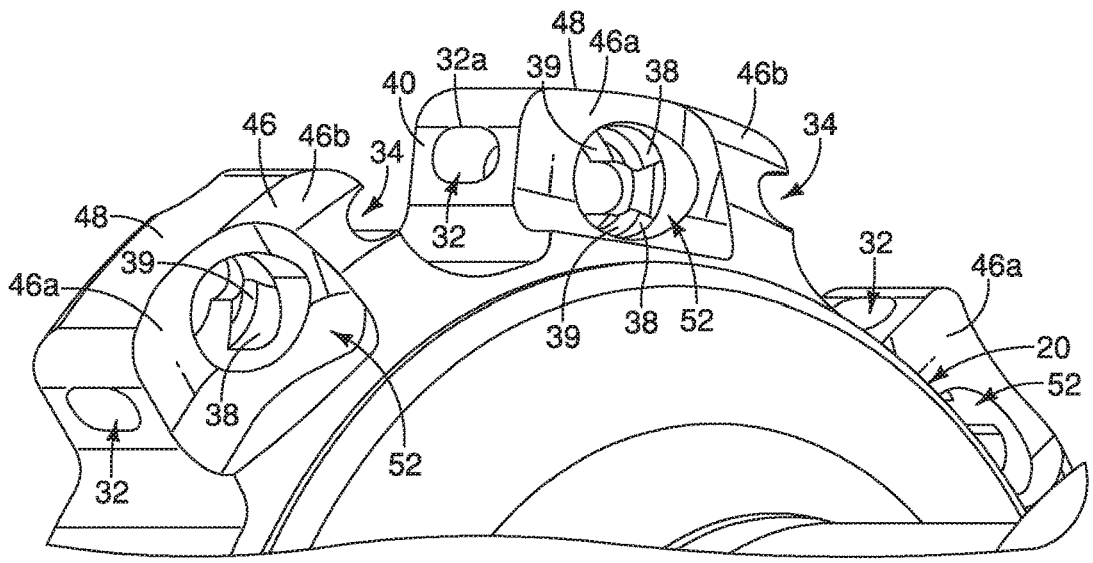
FIG. 9 is another partial left side perspective view of the tubular body illustrated in FIG. 7.
Figure 10:
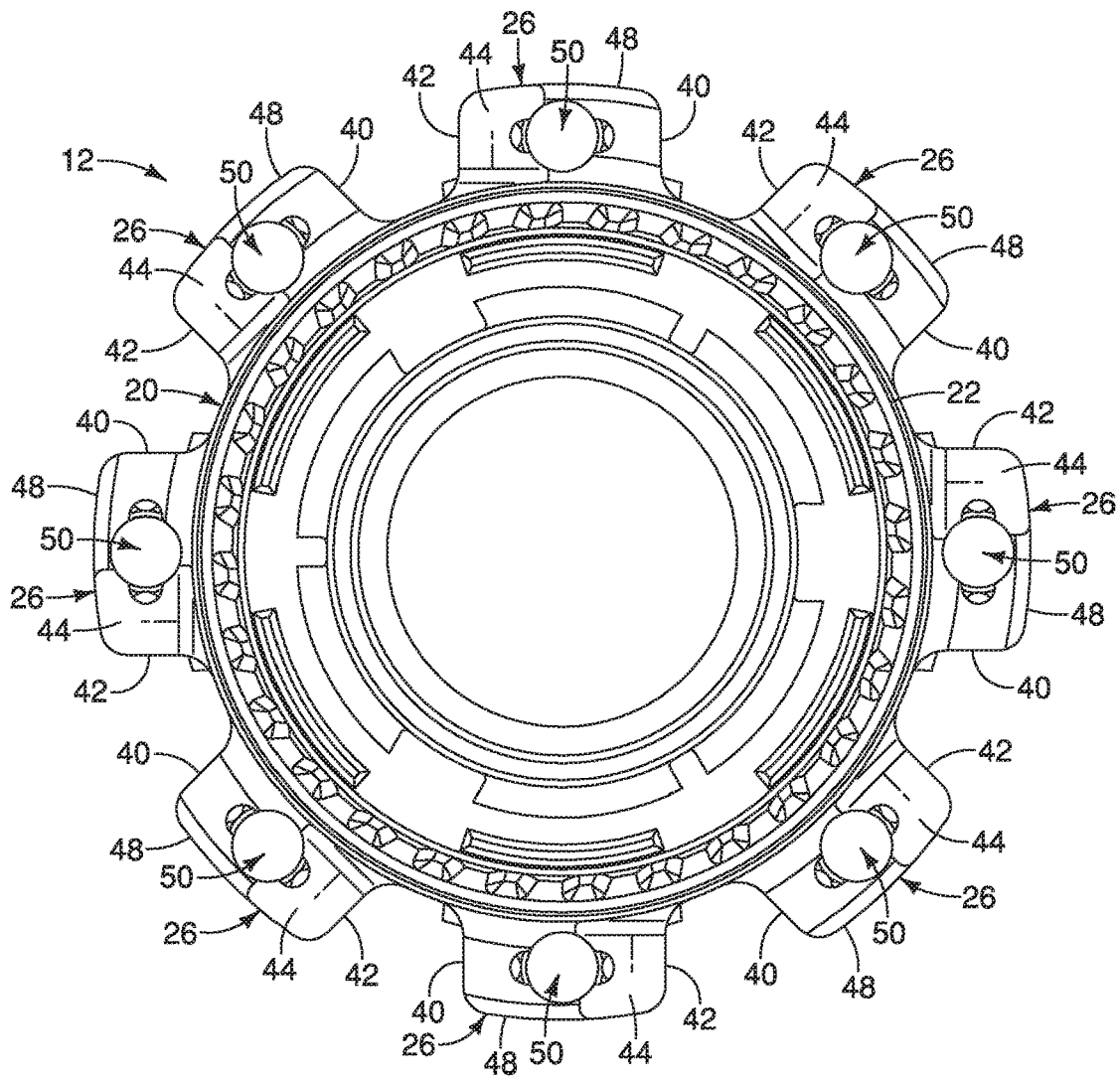
FIG. 10 is a right side elevational view of the tubular body illustrated in FIG. 4.
Figure 14:
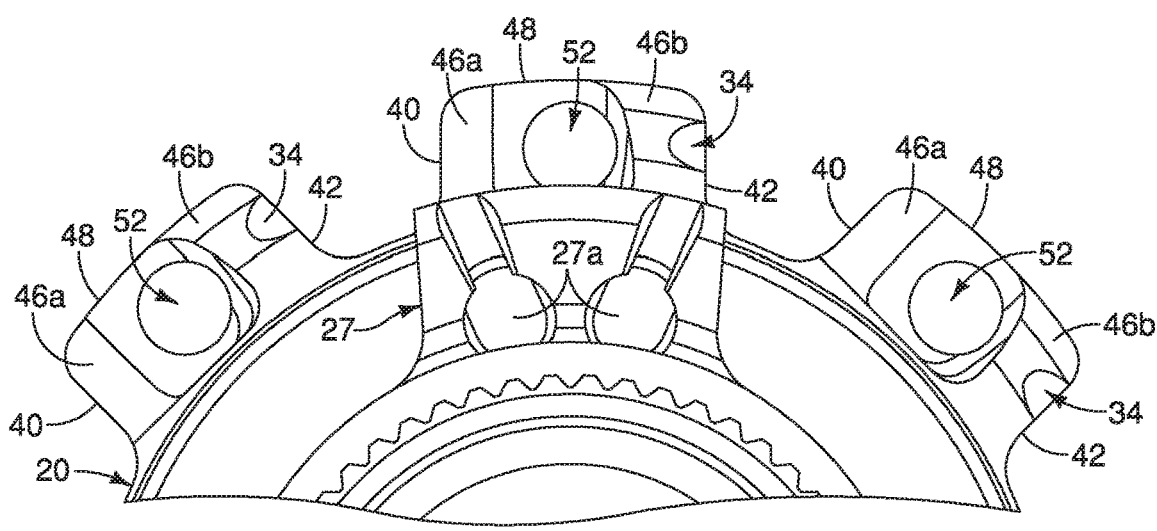
FIG. 14 is an enlarged partial left side elevational view of a portion of the tubular body illustrated in FIG. 13.
Figure 15:
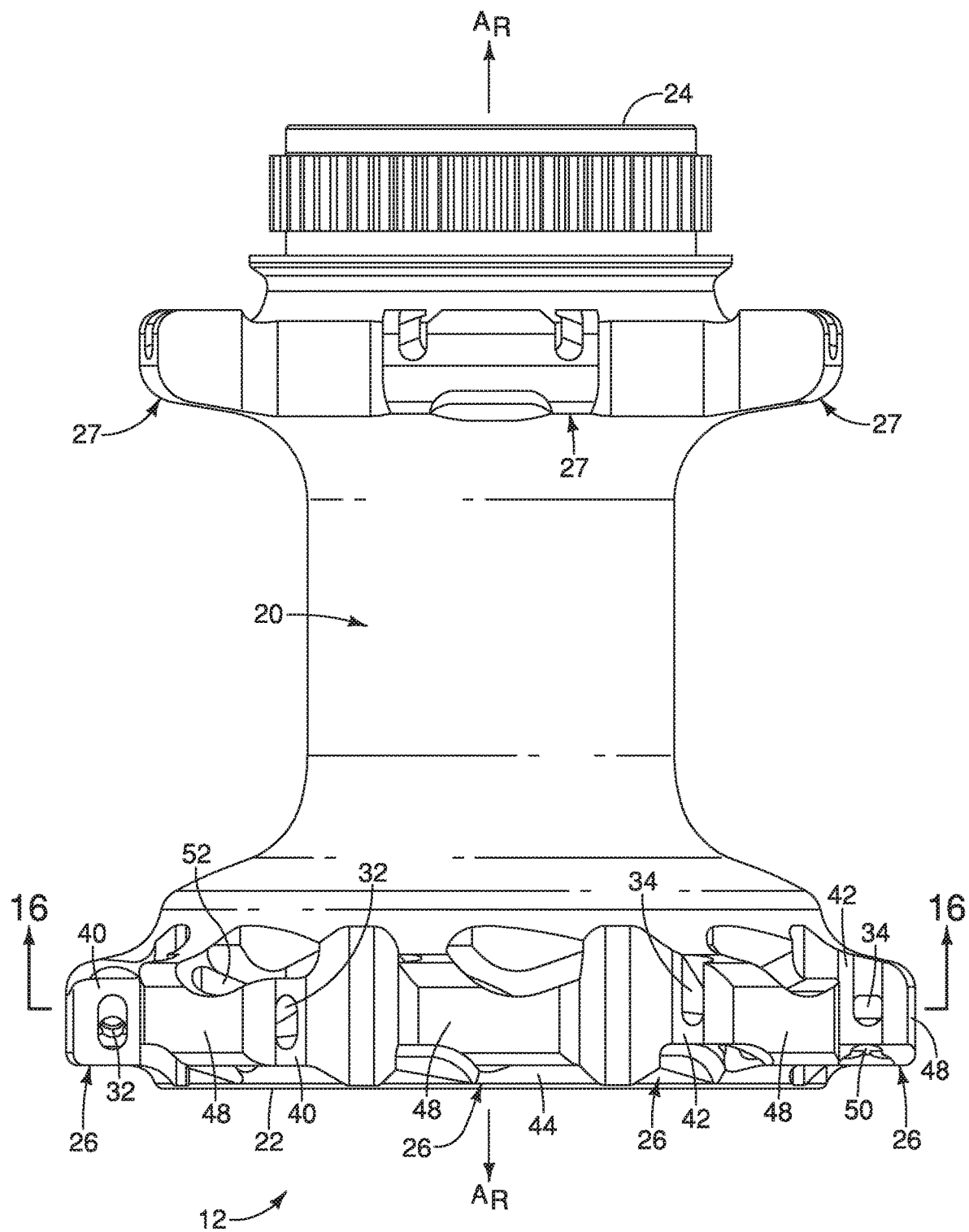
FIG. 15 is a top plan view of the tubular body illustrated in FIG. 4.

As seen in FIGS. 9 and 14, the cavity 30 also includes an inward axial opening 52 that opens from the inner axially facing surface 46 of the spoke attachment part 26 in an axially inward direction parallel to the rotational axis $A_R$ of the tubular body 20. The spoke insertion opening 50 can have a larger diameter than the inward axial opening 52 since the inward axial opening 52 is not used to receive one or more spokes 16. Rather, the purpose of the inward axial opening 52 is to reduce the weight of the spoke attachment part 26 and thus the tubular body 20. Here, the inward axial opening 52 is a circle formed into the recessed first section 46a of the inner axially facing surface 46, but those of ordinary skill in the art will recognize from this disclosure that other shapes, sizes and locations are possible.

Figure 17:
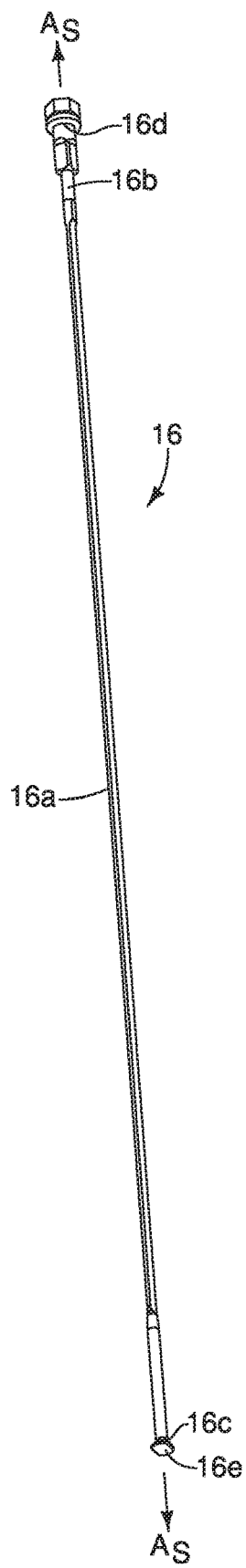
FIG. 17 is a perspective view of one of the spokes illustrated in FIGS. 2 and 3 that is configured to be attached to the tubular body illustrated in FIGS. 4 to 16.
Figure 18:
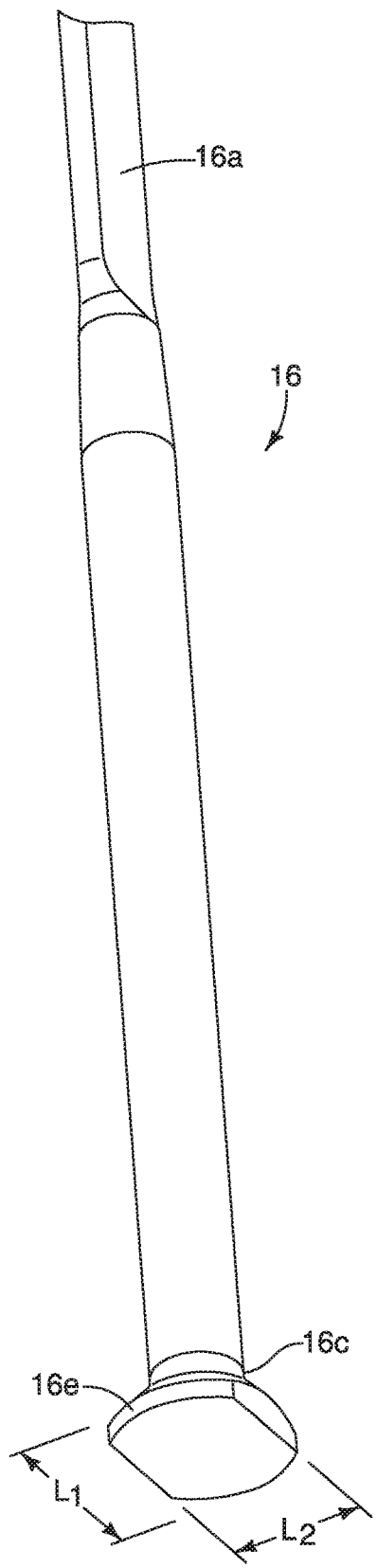
FIG. 18 is an enlarged partial perspective view of the spoke illustrated in FIG. 17.

FIGS. 17 and 18 show an example of a spoke 16 which can be effectively retained by a spoke attachment part 26 made in accordance with the present disclosure. The illustrated spoke 16 can be a first spoke 16A or a second spoke 16B. The spoke 16 includes a longitudinal body 16a which extends along a spoke axis $A_S$ from an outer end 16b to an inner end 16c. The outer end 16b is configured to attach to an annular rim 14 by threading a nipple 16d to a respective aperture in the annular rim 14, while the inner end 16c is configured to attach to a spoke attachment part 26. The spoke 16 further includes an elongated head 16e at the inner end 16c. The elongated head 16e has a first radial length $L_1$ and a second radial length $L_2$. The first radial length $L_1$ is longer than the second radial length $L_2$ and can extend in a radial direction with respect to the rotational axis $A_R$ of the tubular body 20 when retained within a spoke attachment part 26. When both a first spoke 16A and a second spoke 16B are used as disclosed herein, a first elongated head 16e of the first spoke 16A and a second elongated head 16e of the second spoke 16B can each have a first radial length $L_1$ and a second radial length $L_2$ relative to a spoke axis $A_S$ of the longitudinal body 16a, with each of the first spoke 16A and the second spoke 16B having the first radial length $L_1$ longer than the second radial length $L_2$ so as to extend in a radial direction with respect to the rotational axis $A_R$ of the tubular body 20 when retained within a spoke attachment part 26.

Figure 22:
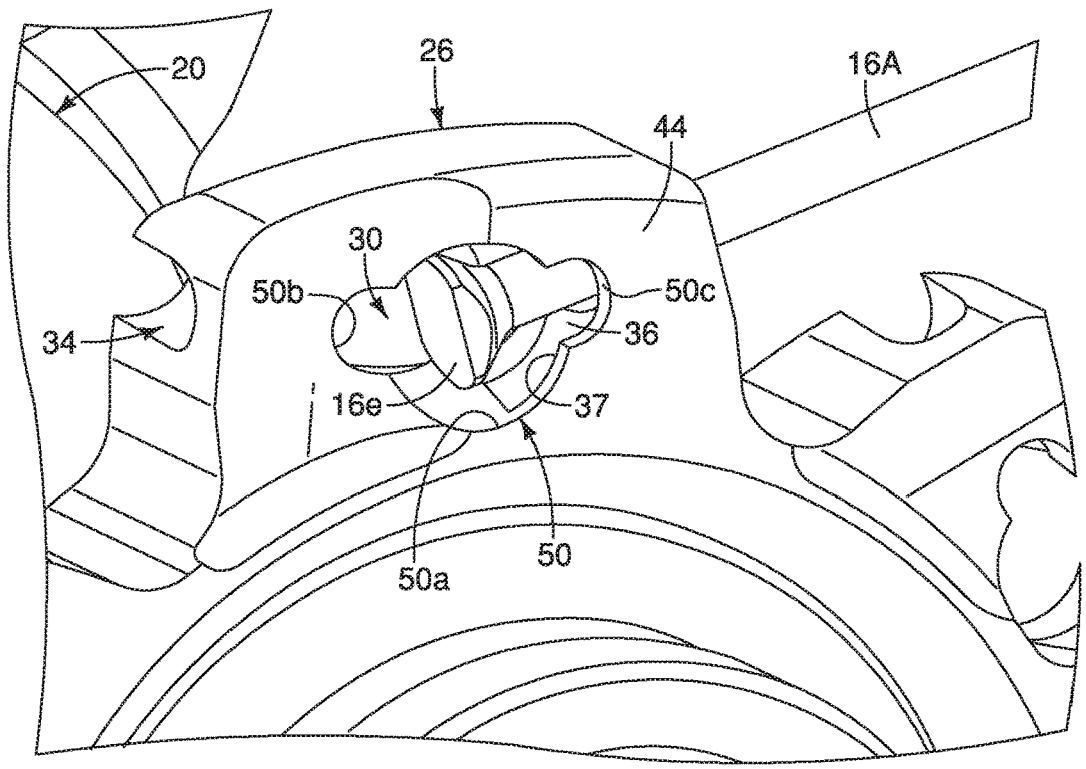
Figure 23:
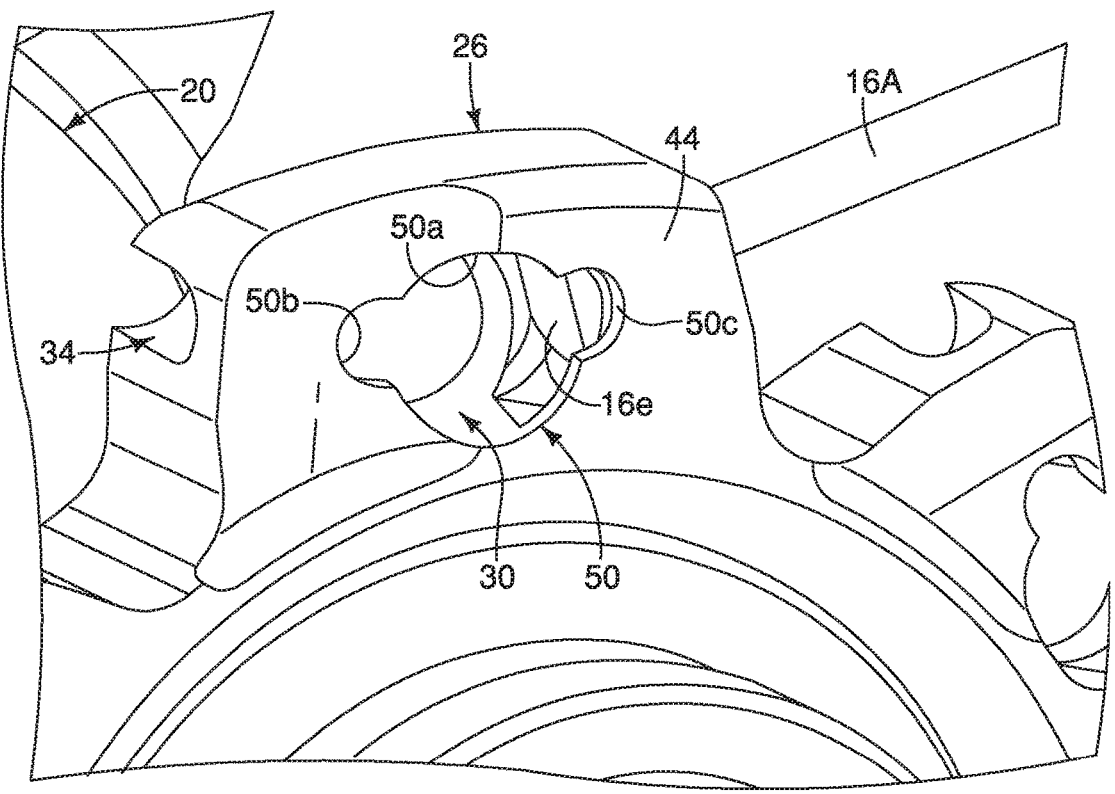
Figure 24:
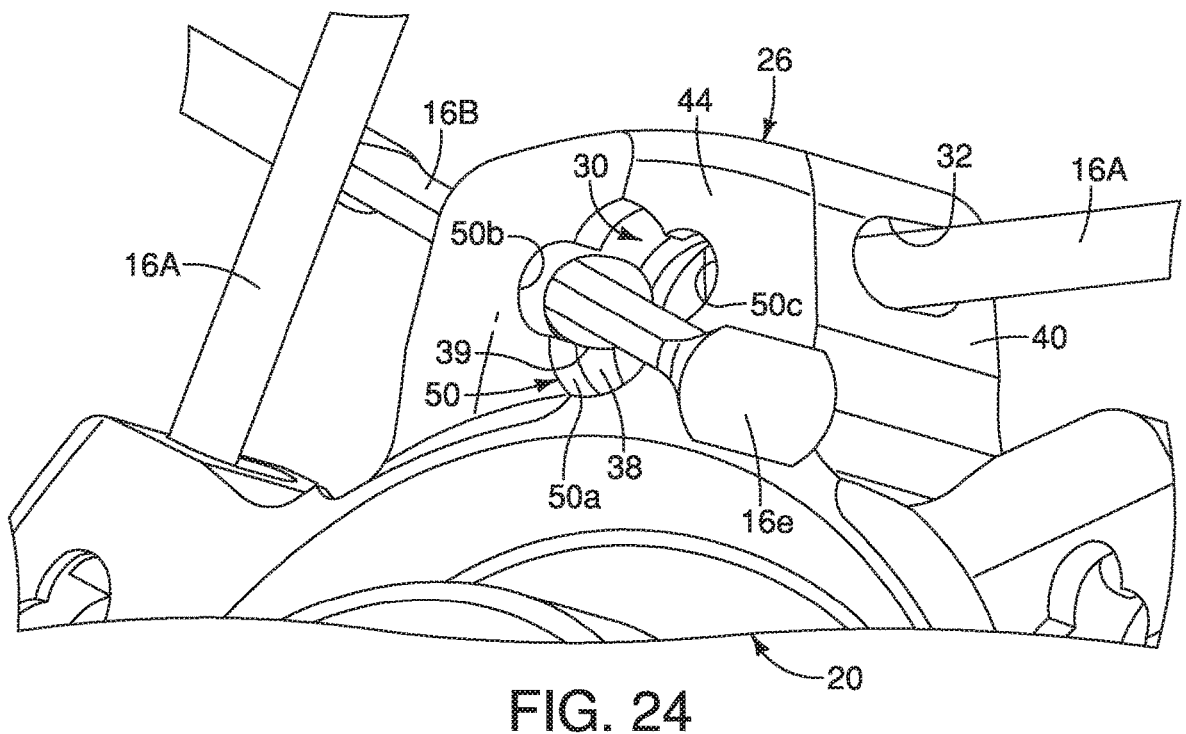

FIGS. 19 to 23 show a first spoke 16A being inserted into a first spoke attachment hole 32, and FIG. 24 shows a second spoke 16B being inserted into a second spoke attachment hole 34. The first spoke 16A and the second spoke 16B can be inserted into the spoke attachment part 26 in either order. In each case, the outer end 16b of the spoke 16 is inserted into the spoke attachment part 26 before the inner end 16c.

In FIG. 19, the outer end 16b of a first spoke 16A is inserted through the spoke insertion opening 50 of the cavity 30 at an angle $\alpha_1$ to the rotational axis $A_R$, wherein the angle $\alpha_1$ substantially matches the inclined angle of the axially inward surface 32c' of the first spoke attachment hole 32. Then, the outer end 16b is inserted through the first spoke attachment hole 32 until exiting the first outer end opening 32a. While being drawn through the first spoke attachment hole 32 at the angle $\alpha_1$, as seen in FIGS. 19 to 21, the elongated head 16e is oriented with the longer first radial length $L_1$ in an approximately axial direction with respect to the rotational axis $A_R$ of the tubular body 20 (e.g., horizontal in FIGS. 20 and 21). The elongated head 16e is oriented with the longer first radial length $L_1$ in an axial direction with respect to the rotational axis $A_R$ of the tubular body 20. At this point, the shorter radial length $L_2$ is in an approximately radial direction with respect to the rotational axis $A_R$ of the tubular body 20 (e.g., vertical in FIGS. 20 and 21). The shorter radial length $L_2$ is in a radial direction with respect to the rotational axis $A_R$ of the tubular body 20. The first spoke 16A can be drawn through the first spoke attachment hole 32 at the angle $\alpha_1$ until the elongated head 16e clears the spoke insertion opening 50 and fully enters the cavity 30.

In FIG. 22, once the elongated head 16e of the first spoke 16A clears the spoke insertion opening 50 and fully enters the cavity 30, the first spoke 16A can be rotated around the spoke axis $A_S$ of the longitudinal body 16a until the elongated head 16e is oriented with the longer first radial length $L_1$ in a radial direction with respect to the rotational axis $A_R$ of the tubular body 20. At the same time, the longitudinal body 16a can be swept axially outwardly with respect to the rotational axis $A_R$ across the axial length $L_{1A}$ of the first outer end opening 32a, such that the longitudinal body 16a moves from being adjacent to the inner axial surface 32c' to being adjacent to the outer axial surface 32c" to be oriented in the first tangential direction $T_1$ as shown in FIG. 22. Then, the first spoke 16A can be drawn through the first spoke attachment hole 32 until the elongated head 16e enters the first spoke head receiving recess 37 and contacts the first spoke head contact surface 36 as shown in FIG. 23.

The second spoke 16B can be inserted into the spoke attachment part 26 in the same way. In FIG. 24, it can be seen that multiple first spokes 16A have been inserted into adjacent spoke attachment parts 26 prior to the second spoke 16B being inserted. Then, when the second spoke 16B is inserted, the second spoke 16B can be placed to cross and contact the first spokes 16A as shown. Thus, in an example embodiment, all of the first spokes 16A can be inserted into all of the spoke attachment parts 26 of a wheel hub 12 before all of the second spokes 16B are inserted.

Similar to the first spoke 16A, the outer end 16b of the second spoke 16B is inserted through the spoke insertion opening 50 of the cavity 30 at an angle $\alpha_2$ to the rotational axis $A_R$, wherein the angle $\alpha_2$ substantially matches the inclined angle of the axially inward surface 34c' of the second spoke attachment hole 34.

Then, the outer end 16b is inserted through the second spoke attachment hole 34 until exiting the second outer end opening 34a. While being drawn through the second spoke attachment hole 34 at the angle $\alpha_2$, the elongated head 16e is oriented with the longer first radial length $L_1$ in an approximately axial direction with respect to the rotational axis $A_R$ of the tubular body 20. The elongated head 16e is oriented with the longer first radial length $L_1$ in an axial direction with respect to the rotational axis $A_R$ of the tubular body 20. At this point, the shorter radial length $L_2$ is in an approximately radial direction with respect to the rotational axis $A_R$ of the tubular body 20. The shorter radial length $L_2$ is in a radial direction with respect to the rotational axis $A_R$ of the tubular body 20. The second spoke 16B can be drawn through the second spoke attachment hole 34 at the angle $\alpha_2$ until the elongated head 16e clears the spoke insertion opening 50 and fully enters the cavity 30.

Once the elongated head 16e of the second spoke 16B clears the spoke insertion opening 50 and fully enters the cavity 30, the second spoke 16B can be rotated around the spoke axis $A_S$ of the longitudinal body 16a until the elongated head 16e is oriented with the longer first radial length $L_1$ in a radial direction with respect to the rotational axis $A_R$ of the tubular body 20. At the same time, the longitudinal body 16a can be swept axially outwardly with respect to the rotational axis $A_R$ across the axial length $L_{2A}$ of the second outer end opening 34a, such that the longitudinal body 16a moves from being adjacent to the inner axial surface 34c' to being adjacent to the outer axial surface 34c" to be oriented in the second tangential direction $T_2$. Then, the second spoke 16B can be drawn through the second spoke attachment hole 32 until the elongated head 16e enters the second spoke head receiving recess 39 and contacts the second spoke head contact surface 38.

Once inserted as shown in FIGS. 19 to 24, the spoke attachment part 26 is configured to retain the first elongated head 16e of the first spoke 16A within the first spoke attachment hole 32 and the second elongated head 16e of the second spoke 16B within the second spoke attachment hole 34. In doing so, the first spoke head contact surface 36 and the second spoke head contact surface 38 are configured to contact the first spoke 16A and the second spoke 16B, respectively. Specifically, the first spoke head contact surface 36 can contact the elongated head 16e of the first spoke 16A as the elongated head 16e is received into the first spoke head receiving recess 37. Likewise, the second spoke head contact surface 38 can contact the elongated head 16e of the second spoke 16B as the elongated head 16e is received into the second spoke head receiving recess 39. The first spoke head receiving recess 37 and the second spoke head receiving recess 39 can each be dimensioned with an axial length to approximately match or slightly exceed the second radial length $L_2$ of an elongated head 16e, such that the elongated head 16e can be received with the second radial length $L_2$ positioned approximately parallel to the rotational axis $A_R$ of the tubular body 20 (e.g., as seen in FIG. 23). The first spoke head receiving recess 37 and the second spoke head receiving recess 39 can also be dimensioned with a radial length to approximately match or slightly exceed the first radial length $L_1$ of an elongated head 16e, such that the elongated head 16e can be received with the first radial length $L_1$ positioned approximately radially with respect to the rotational axis $A_R$ of the tubular body 20 (e.g., as seen in FIG. 23). Thus, each of the first spoke head receiving recess 37 and the second spoke head receiving recess 39 is longer in the radial direction with respect to the rotational axis $A_R$ of the tubular body 20 than in an axial direction parallel to the rotational axis $A_R$ of the tubular body 20. In this way, once a respective elongated head 16e is received within the first spoke head receiving recess 37 or the second spoke head receiving recess 39, the respective spoke 16 is substantially prevented from rotating around its spoke axis $A_S$ due to the axial length of the first spoke head receiving recess 37 or the second spoke head receiving recess 39.

Referring again to FIG. 2, a wheel is shown with a plurality of the spoke attachment parts 26 protruding radially outward from and circumferentially spaced around the first axial end 22 of the tubular body 20 with respect to each other. Each of the plurality of the spoke attachment parts 26 includes the cavity 30, the first spoke attachment hole 32, the first spoke head contact surface 36, the second spoke attachment hole 34, and the second spoke head contact surface 38. The plurality of spoke attachment parts 26 retain a plurality of first spokes 16A within a plurality of first spoke attachment holes 32 and a plurality of second spokes 16B within a plurality of second spoke attachment holes 34. When assembled as shown, the first spoke attachment holes 32 and the second spoke attachment holes 34 are configured to cause the first spokes 16A to contact and intersect the second spokes 16B of adjacent ones of the spoke attachment parts 26.

By inserting the spokes 16 in the manner described herein with respect to FIGS. 19 to 24, with the outer end 16b of each spoke 16 being inserted at an angle before the inner end 16c is received by the spoke attachment part 26, it is easier to cross and contact adjacent first spokes 16A and second spokes 16B. For example, with the second spoke 16B being inserted second at an angle as shown in FIG. 24, the second spoke 16B can be easily brought into contact with the first spoke 16A during insertion.

In FIG. 2, each first spoke 16A crosses and contacts at least one second spoke 16B, and each second spoke 16B crosses and contacts at least one first spoke 16A. Here, with eight (8) spoke attachment parts 26 disposed as shown around the periphery of the first end 22 of the tubular body 20, each first spoke 16A crosses three second spokes 16B, each second spoke 16B crosses three first spokes 16A, each first spoke 16A contacts one second spokes 16B, and each second spoke 16B contacts one first spokes 16A. By using the spoke attachment parts 26 with first spoke attachment holes 32 and second spoke attachment holes 34 disposed as described herein, the first spokes 16A are each slightly offset from any contacting second spokes 16B. It can also be seen that the disclosed wheel hub 12 results in first spokes 16A retained by spoke attachment parts 26 being approximately parallel to second spokes 16B from another spoke attachment part 26 on an opposite side of rotational axis $A_R$.

In understanding the scope of the present invention, the term "comprising" and its derivatives, as used herein, are intended to be open ended terms that specify the presence of the stated features, elements, components, groups, integers, or steps, but do not exclude the presence of other unstated features, elements, components, groups, integers or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle field (e.g., bicycle) in an upright, riding position and equipped with the wheel hub. Accordingly, these directional terms, as utilized to describe the wheel hub should be interpreted relative to a human-powered vehicle field (e.g., bicycle) in an upright riding position on a horizontal surface and that is equipped with the wheel hub. The terms "left" and "right" are used to indicate the "right" when referencing from the right side as viewed from the rear of the human-powered vehicle field (e.g., bicycle), and the "left" when referencing from the left side as viewed from the rear of the human-powered vehicle field (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A wheel hub for a human powered vehicle, the wheel hub comprising:
    a tubular body having a rotational axis; and
    at least one spoke attachment part protruding radially outward from a first axial end of the tubular body,
    the at least one spoke attachment part including
        a cavity including a spoke insertion opening that opens from the at least one spoke attachment part in an axially outward direction parallel to the rotational axis,
        a first spoke attachment hole extending from the cavity in a first direction,
        a first spoke head contact surface located adjacent the first spoke attachment hole,
        a second spoke attachment hole extending from the cavity in a second direction, and
        a second spoke head contact surface located adjacent the second spoke attachment hole,
    the spoke insertion opening and the first spoke attachment hole being configured relative to each other to receive a first spoke inserted into the cavity through the spoke insertion opening and drawn out of the cavity through the first spoke attachment hole,
    the spoke insertion opening and the second spoke attachment hole being configured relative to each other to receive a second spoke inserted into the cavity through the spoke insertion opening and drawn out of the cavity through the second spoke attachment hole, the insertion opening being disposed circumferentially between the first and second spoke attachment holes on the at least one spoke attachment part with respect to the rotational axis of the tubular body, and
    the first spoke attachment hole having a first outer end opening and the second spoke attachment hole having a second outer end opening, the first outer end opening and the second outer end opening each being longer in an axial direction than in a radial direction relative to the rotational axis of the tubular body.

2. The wheel hub according to claim 1, wherein
    the first outer end opening and the second outer end opening are located at a same radial distance from the rotational axis of the tubular body.

3. The wheel hub according to claim 1, wherein
    the first outer end opening and the second outer end opening are substantially aligned in a plane perpendicular to the rotational axis.

4. The wheel hub according to claim 1, wherein
    the first spoke attachment hole has a first inner end opening with a first center point and the second spoke attachment hole has a second inner end opening with a second center point, the first center point and the second center point are in axially offset planes, respectively, with respect to the rotational axis of the tubular body, and the first inner end opening and the second inner end opening overlap as viewed in a direction parallel to the axially offset planes.

5. The wheel hub according to claim 4, wherein
    the first outer end opening has a larger cross-sectional area than the first inner end opening, and
    the second outer end opening has a larger cross-sectional area than the second inner end opening.

6. The wheel hub according to claim 5, wherein
    the first outer end opening extends farther in an axially inward direction than the first inner end opening, and
    the second outer end opening extends farther in the axially inward direction than the second inner end opening.

7. The wheel hub according to claim 4, wherein
    the second inner end opening is partly located axially inwardly with respect to the rotational axis of the tubular body than the first inner end opening.

8. The wheel hub according to claim 7, wherein
    the at least one spoke attachment part includes an outer axially facing surface that includes a first section located on one circumferential side of the spoke insertion opening and a second section located on the other circumferential side of the spoke insertion opening, the second spoke attachment hole is located on a same side of the cavity as the second section, the second section being recessed in an axially inward direction parallel to the rotational axis of the tubular body with respect to the first section.

9. The wheel hub according to claim 1, wherein
    the first spoke attachment hole has a first inner side surface that is inclined in an axially inward direction with respect to a plane perpendicular to the rotational axis of the tubular body, and
    the second spoke attachment hole has a second inner side surface that is inclined in the axially inward direction with respect to the plane perpendicular to the rotational axis of the tubular body.

10. The wheel hub according to claim 1, wherein
    the at least one spoke attachment part is configured to retain a first elongated head of the first spoke at the first spoke head contact surface and a second elongated head of the second spoke at the second spoke head contact surface such that the first elongated head and the second elongated head each has a first radial length and a second radial length relative to a spoke axis, and the first radial length is longer than the second radial length and extends in a radial direction with respect to the rotational axis of the tubular body.

11. The wheel hub according to claim 10, wherein the first spoke head contact surface includes a first spoke head receiving recess, the second spoke head contact surface includes a second spoke head receiving recess, and each of the first spoke head receiving recess and the second spoke head receiving recess is longer in the radial direction with respect to the rotational axis of the tubular body than in an axial direction parallel to the rotational axis of the tubular body.

12. The wheel hub according to claim 1, wherein the at least one spoke attachment part includes a first circumferential side surface and a second circumferential side surface, the first spoke attachment hole has a first outer end opening located at the first circumferential side surface, and the second outer end opening is located at the second circumferential side surface.

13. The wheel hub according to claim 1, wherein the at least one spoke attachment part includes a plurality of the spoke attachment parts protruding radially outward from and circumferentially spaced around the first axial end of the tubular body with respect to each other, and
each of the plurality of the spoke attachment parts includes the cavity, the first spoke attachment hole, the first spoke head contact surface, the second spoke attachment hole, and the second spoke head contact surface.

14. The wheel hub according to claim 13, wherein the first spoke attachment holes and the second spoke attachment holes are configured to cause the first spokes to contact and intersect the second spokes of adjacent ones of the spoke attachment parts.

15. The wheel hub according to claim 1, wherein the first direction is a first tangential direction relative to the tubular body, and
the second direction is a second tangential direction relative to the tubular body that is opposite the first tangential direction.

16. The wheel hub according to claim 1, wherein the second direction is opposite to the first direction with respect to the cavity in a circumferential direction with respect to the rotational axis of the tubular body.

17. A wheel comprising the wheel hub according to claim 1, and further comprising:
a rim connected to the wheel hub by a plurality of spokes that include the first spoke and the second spoke.

18. A wheel hub for a human powered vehicle, the wheel hub comprising:
a tubular body having a rotational axis; and
at least one spoke attachment part protruding radially outward from a first axial end of the tubular body,
the at least one spoke attachment part including
a cavity including a spoke insertion opening that opens from the at least one spoke attachment part in an axially outward direction parallel to the rotational axis,
a first spoke attachment hole extending from the cavity in a first direction,
a first spoke head contact surface located adjacent the first spoke attachment hole,
a second spoke attachment hole extending from the cavity in a second direction, and
a second spoke head contact surface located adjacent the second spoke attachment hole,
the spoke insertion opening and the first spoke attachment hole being configured relative to each other to receive a first spoke inserted into the cavity through the spoke insertion opening and drawn out of the cavity through the first spoke attachment hole,
the spoke insertion opening and the second spoke attachment hole being configured relative to each other to receive a second spoke inserted into the cavity through the spoke insertion opening and drawn out of the cavity through the second spoke attachment hole, and
the first spoke attachment hole having a first outer end opening and the second spoke attachment hole having a second outer end opening, the first outer end opening and the second outer end opening each being longer in an axial direction than in a radial direction relative to the rotational axis of the tubular body,
the at least one spoke attachment part including an outer axially facing surface that includes a first section located on one circumferential side of the spoke insertion opening and a second section located on the other circumferential side of the spoke insertion opening, and the second section being recessed in an axially inward direction parallel to the rotational axis of the tubular body with respect to the first section.

19. A wheel hub for a human powered vehicle, the wheel hub comprising:
a tubular body having a rotational axis; and
at least one spoke attachment part protruding radially outward from a first axial end of the tubular body,
the at least one spoke attachment part including
a cavity including a spoke insertion opening that opens from the at least one spoke attachment part in an axially outward direction parallel to the rotational axis,
a first spoke attachment hole extending from the cavity in a first direction,
a first spoke head contact surface located adjacent the first spoke attachment hole,
a second spoke attachment hole extending from the cavity in a second direction, and
a second spoke head contact surface located adjacent the second spoke attachment hole,
the spoke insertion opening and the first spoke attachment hole being configured relative to each other to receive a first spoke inserted into the cavity through the spoke insertion opening and drawn out of the cavity through the first spoke attachment hole,
the spoke insertion opening and the second spoke attachment hole being configured relative to each other to receive a second spoke inserted into the cavity through the spoke insertion opening and drawn out of the cavity through the second spoke attachment hole, and
the first spoke attachment hole having a first outer end opening and the second spoke attachment hole having a second outer end opening, the first outer end opening and the second outer end opening each being longer in an axial direction than in a radial direction relative to the rotational axis of the tubular body,
the spoke insertion opening including a center opening section, a first semi-circular opening section located on one circumferential side of the center opening section, and a second semi-circular opening section being located on the other circumferential side of the center opening section.

20. A wheel hub for a human powered vehicle, the wheel hub comprising:
- a tubular body having a rotational axis; and
- at least one spoke attachment part protruding radially outward from a first axial end of the tubular body,
- the at least one spoke attachment part including
  - a cavity including a spoke insertion opening that opens from the at least one spoke attachment part in an axially outward direction parallel to the rotational axis,
  - a first spoke attachment hole extending from the cavity in a first direction,
  - a first spoke head contact surface located adjacent the first spoke attachment hole,
  - a second spoke attachment hole extending from the cavity in a second direction, and
  - a second spoke head contact surface located adjacent the second spoke attachment hole,
- the spoke insertion opening and the first spoke attachment hole being configured relative to each other to receive a first spoke inserted into the cavity through the spoke insertion opening and drawn out of the cavity through the first spoke attachment hole,
- the spoke insertion opening and the second spoke attachment hole being configured relative to each other to receive a second spoke inserted into the cavity through the spoke insertion opening and drawn out of the cavity through the second spoke attachment hole, and
- the first spoke attachment hole having a first outer end opening and the second spoke attachment hole having a second outer end opening, the first outer end opening and the second outer end opening each being longer in an axial direction than in a radial direction relative to the rotational axis of the tubular body,
- the cavity including an inward axial opening that opens from the at least one spoke attachment part in an axially inward direction parallel to the rotational axis of the tubular body.

21. The wheel hub according to claim 20, wherein the spoke insertion opening has a larger diameter than the inward axial opening.

22. A wheel hub for a human powered vehicle, the wheel hub comprising:
- a tubular body having a rotational axis; and
- at least one spoke attachment part protruding radially outward from a first axial end of the tubular body,
- the at least one spoke attachment part including
  - a cavity including a spoke insertion opening that opens from the at least one spoke attachment part in an axially outward direction parallel to the rotational axis,
  - a first spoke attachment hole extending from the cavity in a first direction,
  - a first spoke head contact surface located adjacent the first spoke attachment hole,
  - a second spoke attachment hole extending from the cavity in a second direction, and
  - a second spoke head contact surface located adjacent the second spoke attachment hole,
- the spoke insertion opening and the first spoke attachment hole being configured relative to each other to receive a first spoke inserted into the cavity through the spoke insertion opening and drawn out of the cavity through the first spoke attachment hole, the spoke insertion opening and the first attachment hole being separated from each other by an outer axially facing surface of the at least one spoke attachment part,
- the spoke insertion opening and the second spoke attachment hole being configured relative to each other to receive a second spoke inserted into the cavity through the spoke insertion opening and drawn out of the cavity through the second spoke attachment hole, the spoke insertion opening and the second attachment hole being separated from each other by the outer axially facing surface of the at least one spoke attachment part, and
- the first spoke attachment hole having a first outer end opening and the second spoke attachment hole having a second outer end opening, the first outer end opening and the second outer end opening each being longer in an axial direction than in a radial direction relative to the rotational axis of the tubular body.

* * * * *